(12) United States Patent
Abe

(10) Patent No.: US 10,838,183 B2
(45) Date of Patent: Nov. 17, 2020

(54) DRY OBJECTIVE

(71) Applicant: OLYMPUS CORPORATION, Hachioji (JP)

(72) Inventor: Kenichiro Abe, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 94 days.

(21) Appl. No.: 16/284,476

(22) Filed: Feb. 25, 2019

(65) Prior Publication Data

US 2019/0324246 A1 Oct. 24, 2019

(30) Foreign Application Priority Data

Apr. 19, 2018 (JP) .................... 2018-080945

(51) Int. Cl.
| | | |
|---|---|---|
| *G02B 21/02* | (2006.01) | |
| *G02B 9/10* | (2006.01) | |
| *G02B 27/00* | (2006.01) | |
| *G02B 21/16* | (2006.01) | |

(52) U.S. Cl.
CPC .............. *G02B 21/02* (2013.01); *G02B 9/10* (2013.01); *G02B 27/0068* (2013.01); *G02B 21/16* (2013.01)

(58) Field of Classification Search
CPC .................................................. G02B 21/02
USPC ....................................................... 359/661
See application file for complete search history.

(56) References Cited

U.S. PATENT DOCUMENTS

2004/0201900 A1* 10/2004 Kurata ................. G02B 21/02
359/660
2006/0279847 A1 12/2006 Matthae et al.

FOREIGN PATENT DOCUMENTS

DE 102005027423 A1 12/2006
JP 2010134218 A 6/2010

* cited by examiner

*Primary Examiner* — James C. Jones
(74) *Attorney, Agent, or Firm* — Holtz, Holtz & Volek PC

(57) ABSTRACT

A dry objective including the first lens group having a positive refractive power that converts a divergent pencil of light from an object point into a convergent pencil of light and the second lens group having a negative refractive power. The objective includes a moving lens component that moves along an optical axis and satisfies the following conditional expressions of:

$$0.85 \leq NA_{ob} < 1.0 \qquad (1); \text{ and}$$

$$9 \text{ mm} \leq Y_{reso} \times |\beta| \leq 20 \text{ mm} \qquad (3),$$

where $NA_{ob}$ is a numerical aperture, $Y_{reso}$ is a maximum object height in a region in which a value obtained by dividing RMS wavefront aberration at the e-line by a wavelength of the e-line is 0.2 or smaller, the region being on a plane that is orthogonal to the optical axis and intersects with an on-axis position at which the RMS wavefront aberration at the e-line is minimized, and β is a magnification of the objective.

20 Claims, 10 Drawing Sheets

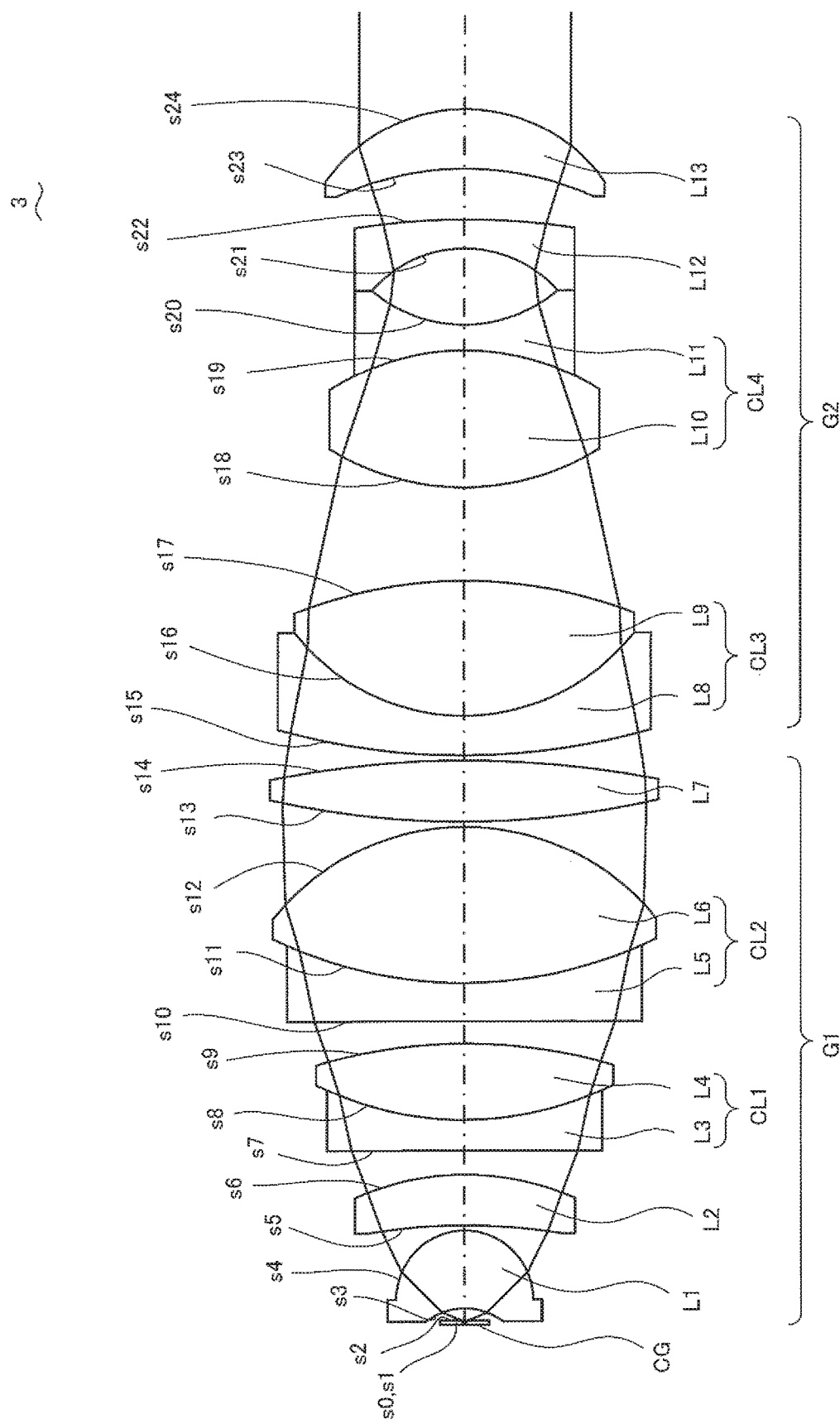
F I G. 7

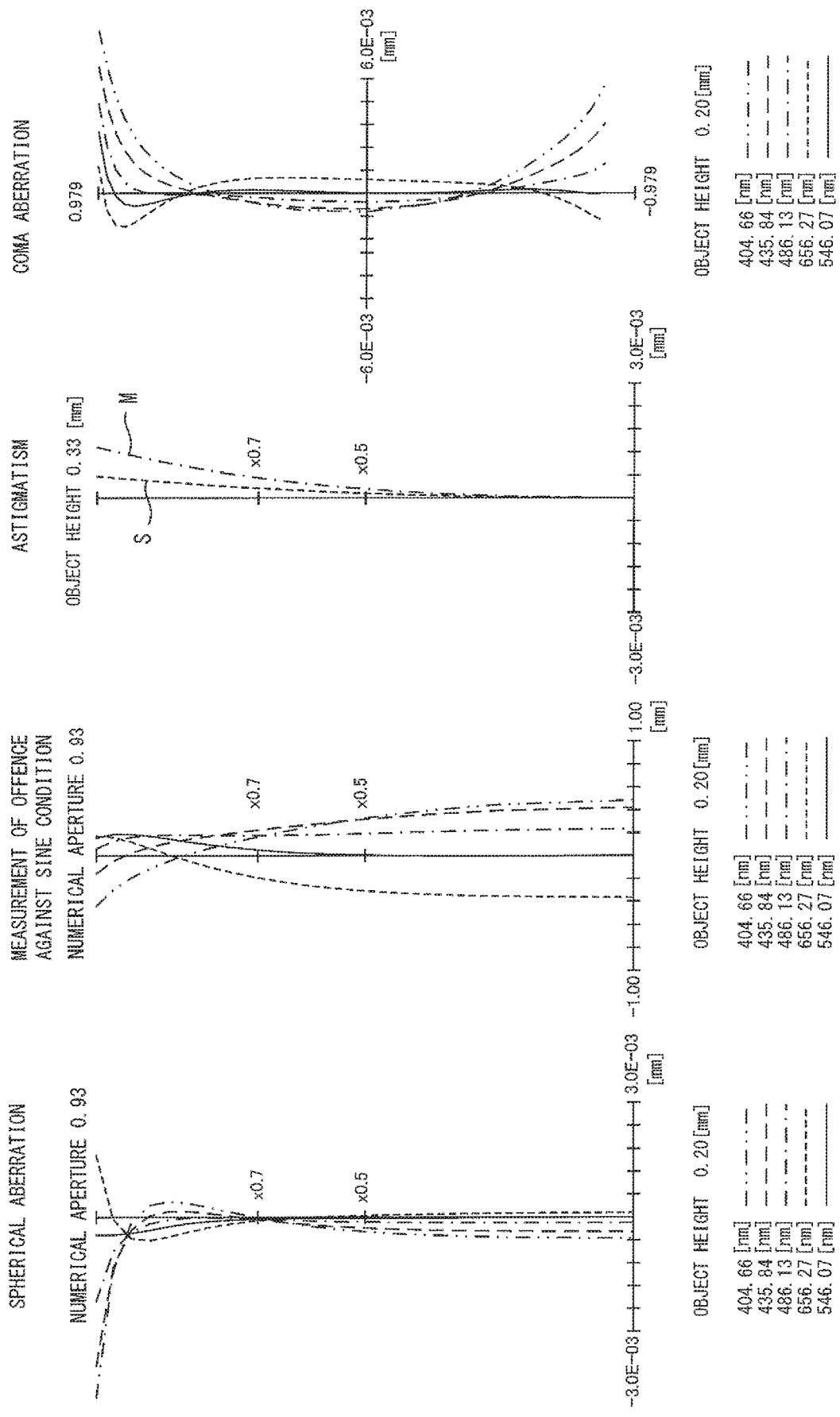

DRY OBJECTIVE

CROSS REFERENCE TO RELATED APPLICATIONS

This application is based upon and claims the benefit of priority from prior Japanese Patent Application No. 2018-080945, filed Apr. 19, 2018, the entire contents of which are incorporated herein by this reference.

BACKGROUND OF THE INVENTION

Field of the Invention

The disclosure of the present specification relates to a dry objective.

Description of the Related Art

In recent years expectations for microscopes that allow wide-field and high-resolution observation and image capture have been rising. Such a microscope is expected to have an objective that has a high numerical aperture (hereinafter referred to as NA) and realizes good aberration performance across a wide field of view. When the microscope is used as a biological microscope, the objective is desirably one that can be used in fluorescent observation utilizing excitation in a wide range of wavelength from a short wavelength of around 400 nm to a near-infrared wavelength. In addition, in consideration of the usability at the time of observation, the objective is desirably a dry objective.

A conventional dry objective with high NA is disclosed in Japanese Laid-open Patent Publication No. 2010-134218 as an example.

SUMMARY OF THE INVENTION

The objective according to one of the embodiments of the present invention is a dry objective including the first lens group having a positive refractive power that converts a divergent pencil of light from an object point into a convergent pencil of light and the second lens group having a negative refractive power and being arranged closer to an image than the first lens group being. The dry objective includes a moving lens component that moves along an optical axis and satisfies the following conditional expressions of:

$$0.85 \leq NA_{ob} < 1.0 \tag{1}$$

and $$9 \text{ mm} \leq Y_{reso} \times |\beta| \leq 20 \text{ mm} \tag{3},$$

where $NA_{ob}$ is a numerical aperture of the dry objective, $Y_{reso}$ is a maximum object height in a region in which a value obtained by dividing RMS wavefront aberration at the e-line by a wavelength of the e-line is 0.2 or smaller, the region being on a plane that is orthogonal to the optical axis and intersects with an on-axis position at which the RMS wavefront aberration at the e-line is minimized, and $\beta$ is a magnification of the objective.

The objective according to another of the embodiments of the present invention is a dry objective including the first lens group having a positive refractive power that converts a divergent pencil of light from an object point into a convergent pencil of light and the second lens group having a negative refractive power and being arranged closer to an image than the first lens group being. The dry objective includes a moving lens component that moves along an optical axis and satisfies the following conditional expressions of:

$$0.85 \leq NA_{ob} < 1.0 \tag{1};$$

and $$-2 \leq \Delta z_1 / DOF_e \leq 2 \tag{2},$$

where $NA_{ob}$ is a numerical aperture of the dry objective, $\Delta z_1$ is a difference between an on-axis position at which RMS wavefront aberration at the h-line is minimized and an on-axis position at which RMS wavefront aberration at the e-line is minimized, and $DOF_e$ is the depth of focus at the e-line.

BRIEF DESCRIPTION OF THE DRAWINGS

The present invention will be more apparent from the following detailed description when the accompanying drawings are referenced.

FIG. 4A is a diagram illustrating a spherical aberration, and FIG. 4B is a diagram illustrating a measurement of offence against sine condition. FIG. 4C is a diagram illustrating an astigmatism, and FIG. 4D is a diagram illustrating a coma aberration at a position at which an object height ratio is 0.6.

FIG. 6A is a diagram illustrating a spherical aberration. FIG. 6B is a diagram illustrating a measurement of offence against sine condition. FIG. 6C is a diagram illustrating an astigmatism. FIG. 6D is a diagram illustrating a coma aberration at a position at which an object height ratio is 0.6.

FIG. 7 is a cross-sectional view of the objective 3 according to Embodiment 3 of the present invention.

FIG. 8A is a diagram illustrating a spherical aberration. FIG. 8B is a diagram illustrating a measurement of offence against sine condition. FIG. 8C is a diagram illustrating an astigmatism. FIG. 8D is a diagram illustrating a coma aberration at a position at which an object height ratio is 0.6 (the object height 0.2 mm).

FIG. 10A to FIG. 10D are diagrams of aberrations of the objective 4 illustrated in FIG. 9. FIG. 10A is a diagram illustrating a spherical aberration. FIG. 10B is a diagram illustrating a measurement of offence against sine condition. FIG. 10C is a diagram illustrating an astigmatism. FIG. 10D is a diagram illustrating a coma aberration at a position at which an object height ratio is 0.6.

DESCRIPTION OF THE EMBODIMENTS

Figure 1:
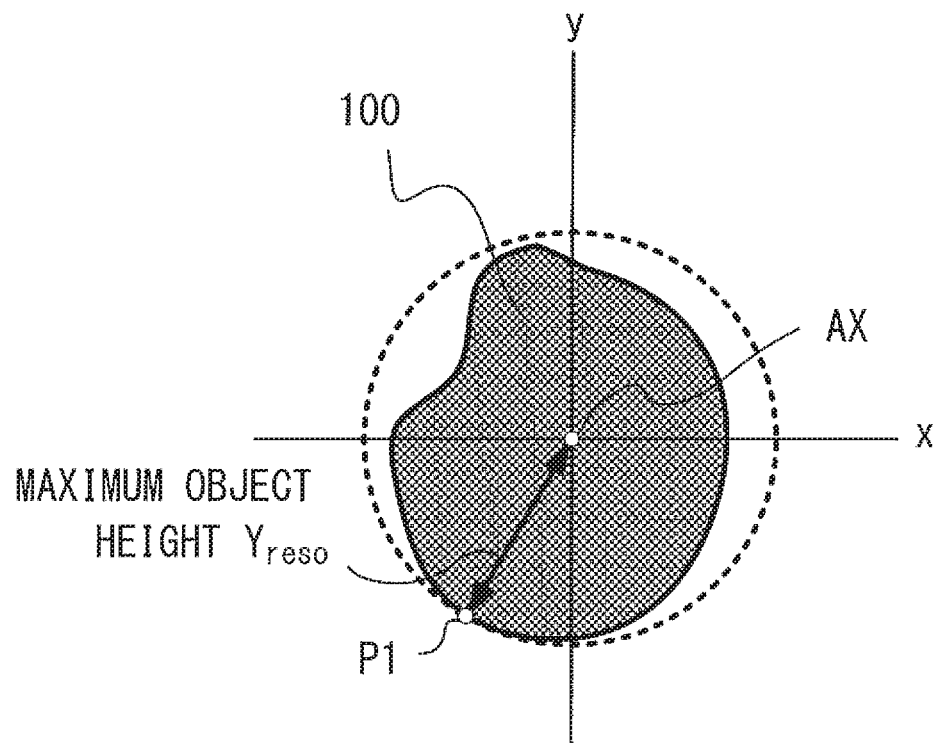
FIG. 1 is a diagram for explaining a maximum object height $Y_{reso}$.

Correction of axial chromatic aberration and correction of off-axis aberration such as field curvatures and coma aberrations are not sufficient in the objective disclosed in Japanese Laid-open Patent Publication No. 2010-134218. It is therefore difficult to exhibit good performance across a wide field of view at a wide range of wavelength.

In the following description, an objective according to one of the embodiments of the present application is explained. The objective according to this embodiment (hereinafter simply referred to as the objective) is an infinity-corrected microscope objective used in combination with a tube lens. The objective is a so-called dry objective that is used for observation of a specimen with air mediating between the specimen and the objective.

The objective includes the first lens group that has a positive refractive power, which converts divergent pencil of light from an object point to convergent pencil of light, and the second lens group that has a negative refractive power and is arranged closer to an image than the first lens group is. In the first lens group, the lens component closest to the image is a lens component that converts a divergent pencil of light from an object point into a convergent pencil of light and works to emit the convergent pencil of light. The lens component is closest to an object among lens component that works such way. In other words, when the objective has multiple lens surfaces that emit a convergent pencil of light, a lens surface closest to an object from among the multiple lens surfaces is a lens surface closest to an image in the first lens group. A boundary between the first lens group and the second lens group can be identified by the characteristics described above.

In the present specification, a pencil of light is a bundle of light rays emitted from a point on an object (an object point). A lens component is a lens block in which only two surfaces, an object-side surface and an image-side surface, have contact with air (or an immersion liquid), from among lens surfaces through which a light ray originated from an object point passes, regardless of a single lens or a cemented lens.

The first lens group converts a divergent pencil of light from an object point into a convergent pencil of light and causes the convergent pencil of light to enter the second lens group. The second lens group converts the convergent pencil of light from the first lens group into a collimated pencil of light. As a result of converting a divergent pencil of light from an object point into a convergent pencil of light and causing the convergent pencil of light to enter the second lens group, the height of a marginal ray in the second lens group can be made lower than the height of a marginal ray in the first lens group. This results in effective correction of the Petzval sum in the second lens group having a negative refractive power. Consequently, a field curvature can be favorably corrected across a wide field of view.

The objective is also an objective that includes at least one lens component moving along an optical axis (hereinafter referred to as the moving lens component) and has a high NA. The objective is configured to satisfy the following conditional expression (1).

$$0.85 \leq NA_{ob} < 1.0 \tag{1}$$

Here, $NA_{ob}$ is the numerical aperture of the objective and is more specifically the numerical aperture of the objective on an object side.

In the objective with a high NA, spherical aberrations tend to undergo a significant change in response to a slight change in the thickness or the refractive index of cover glasses. When the objective having at least one moving lens component, such a change in the spherical aberrations can be compensated by the movement of the moving lens component.

The conditional expression (1) is a conditional expression to obtain sufficient resolution in the observation using an objective. As long as $NA_{ob}$ is equal to or higher than the lower limit, the Airy disk diameter can be kept sufficiently small and the depth of focus can also be small. As a result, sufficient resolution can be obtained. In addition, as long as $NA_{ob}$ is lower than the upper limit, a spread angle of a marginal ray entering the objective will not be too large. Consequently, sufficient correction of mainly the coma aberration can be performed. As a result, a sufficient resolution can be obtained.

In addition, the objective is configured to satisfy the following conditional expression (2).

$$-2 \leq \Delta z_1 / DOF_e \leq 2 \tag{2}$$

Here, $\Delta z_1$ is a difference between an on-axis position at which the RMS (Root-Mean-Square) wavefront aberration at the h-line (404.66 nm) is minimized (denoted as the minimized position at h-line) and an on-axis position at which the RMS wavefront aberration at the e-line (404.66 nm) is minimized (denoted as the minimized position at e-line). $DOF_e$ denotes the depth of focus at the e-line.

Here, the on-axis position is an on-axis position in a region between the object and the objective. The difference between the above-described positions refers to the minimized position at the h-line with reference to the minimized position at the e-line when a direction away from a specimen is defined as a positive direction. In other words, when the minimized position at h-line is located closer to an image than the minimized position at e-line is, the above difference between positions has a positive value. In addition, a formula for calculation of the depth of focus $DOF_e$ is $DOF_e = \lambda_e / (2 \times NA_{ob}^2)$ where the e-line wavelength is $\lambda_e$.

The conditional expression (2) is a conditional expression mainly for favorably correcting the axial chromatic aberration. Since the fluorescent observation using an excitation light of a short wavelength near the h-line is frequently performed in the microscope optical system in biology, axial chromatic aberration properties of the h-line and the e-line are important. When $\Delta z_1 / DOF_e$ is higher than the upper limit or lower than the lower limit, the axial chromatic aberration generated in an objective will become too large. In this case, without significant compensation of the axial chromatic aberration in a tube lens, large axial chromatic aberration will be generated on an image plane. However, it is difficult in practice to compensate large axial chromatic aberration in a tube lens. Here, compensating an aberration in a tube lens means making the tube lens itself have an aberration. Considering the fact that an objective is used in combination with a tube lens and multiple objectives having different aberration properties are switched to one another in use, compensation of axial chromatic aberrations by a tube lens is not preferable. By satisfying the conditional expression (2), the objective alone can favorably correct the axial chromatic aberration. In particular, even when a short wavelength light such as the h-line is used as an excitation light, the axial chromatic aberration can be favorably corrected.

The objective described above has a high NA and can favorably correct chromatic aberration and off-axis performance.

Instead of the conditional expression (2), the objective may be configured to satisfy the following conditional expression (3).

$$9 \text{ mm} \leq Y_{reso} \times |\beta| \leq 20 \text{ mm} \tag{3}$$

Here, $Y_{reso}$ is a maximum object height in a region in which a value obtained by dividing the RMS wavefront aberration at the e-line by a wavelength of the e-line is 0.2 or smaller, and the region is on a plane that is orthogonal to an optical axis and intersects with an on-axis position at which RMS wavefront aberration at the e-line is minimized (the minimized position at e-line). β is a magnification of the objective.

The magnification β of the objective is a magnification when the objective is used in combination with a tube lens that has a predetermined focal length for each objective and can be calculated by the focal length of the tube lens/the focal length of the objective. The predetermined focal length of a tube lens is, for example, 180 mm.

As illustrated in FIG. 1, the maximum object height $Y_{reso}$ is the maximum object height in a region 100 that satisfies the prescribed conditions. Note that FIG. 1 illustrates a cross section orthogonal to the optical axis of an objective that intersects with the minimized position at e-line (the cross section is hereinafter referred to as the minimized cross section at e-line). A maximum object height $Y_{reso}$ can be obtained as below. At each point on the minimized cross section at e-line, (RMS wavefront aberration at the e-line)/$\lambda_e$ is calculated. Next, the region 100 that satisfies (RMS wavefront aberration at the e-line)/$\lambda_e \leq 0.2$ is identified within the minimized cross section at e-line. Furthermore, a point P1 that is the most distant from an optical axis AX within the region 100 is identified. Finally, a distance between the point P1 and the optical axis AX is calculated as a maximum object height $Y_{reso}$.

When the objective is a rotation symmetry lens, the region 100 is also rotationally symmetric (i.e., circular). For that reason, the object height in the region 100 is constant regardless of the orientation, and the maximum object height $Y_{reso}$ is the constant object height. However, when an objective has a production error, the region 100 is rotationally asymmetric. As a result, as illustrated in FIG. 1 as an example, the object height in the region 100 depends on the orientation. In this case, the maximum object height $Y_{reso}$ is the object height in an orientation in which a distance from the optical axis to the boundary of the region 100 is the longest.

The conditional expression (3) is a conditional expression to obtained a favorable peripheral resolution in an observation using an objective. Note that the peripheral resolution refers to a resolution in the periphery of the field of view and tends to degrade when large off-axis aberration is generated. When $Y_{reso} \times |\beta|$ is lower than the lower limit, the off-axis aberration of an objective becomes excessively large. In this case, significant aberration compensation is needed in a tube lens. However, it is difficult in practice to compensate large off-axis aberration in a tube lens. Compensation of an aberration in a tube lens means making the tube lens itself have an aberration. This is not preferable for the reason explained with respect to the conditional expression (2). On the other hand, when $Y_{reso} \times |\beta|$ is higher than the upper limit, a range in which off-axis aberration is favorable becomes larger in the primary imaging position. However, when an attempt is made to capture an image with the larger range, an imaging device and a unit to hold the imaging device become larger, and this is not favorable. When the conditional expression (3) and the conditional expression (1) are satisfied, favorable peripheral resolution can be achieved.

Accordingly, an objective configured to satisfy the conditional expression (3) instead of the conditional expression (2) also has a high NA and can also favorably correct chromatic aberration and off-axis performance.

An objective may include a first negative lens that has a negative refractive power and may be configured to satisfy the following conditional expression (4) and conditional expression (5) instead of the conditional expression (2).

$$30 \leq \nu d_1 \leq 43 \quad (4)$$

$$0.55 < \theta g F_1 \leq 0.57 \quad (5)$$

Here, $\nu d_1$ is the Abbe number of the first negative lens. $\theta g F_1$ is a partial dispersion ratio of the first negative lens. More specifically, the partial dispersion ratio $\theta g F_1$ can be calculated by $(n_g - n_F)/(n_F - n_C)$ where $n_C$ is the refractive index at the C-line, $n_F$ is the refractive index at the F-line, and $n_g$ the refractive index at the g-line. Note that the materials of the first negative lens that satisfies the conditional expression (4) and the conditional expression (5) include S-LAH55V manufactured by OHARA INC. and N-KZFS11 manufactured by SCHOTT AG.

The conditional expression (4) and the conditional expression (5) are conditional expressions for achieving favorable correction of chromatic aberration. When no single negative lens having the Abbe number of the upper limit provided in the conditional expression (4) or lower exists in an objective, the chromatic aberration from the C-line to the F-line is difficult to effectively correct and correction of chromatic aberrations in the visible range in the entirety of the objective will become difficult. When negative lenses satisfy the conditional expression (4) but no single negative lens has the partial dispersion ratio of the upper limit provided in the conditional expression (5) or lower from among the negative lenses, such negative lenses will excessively correct the chromatic aberration from the g-line to the h-line. As a result, the chromatic aberrations at the g-line or at the h-line is excessively corrected in the entirety of the objective, making the favorable correction of chromatic aberrations difficult. By satisfying the conditional expression (4) and the conditional expression (5), chromatic aberrations can be favorably corrected in a wide range of wavelength.

It should be noted that an optical material that satisfies the conditional expression (4) and having the partial dispersion ratio lower than the lower limit provided in the conditional expression (5) is not normally used. In addition, an optical material that satisfies the conditional expression (5) and having the Abbe number lower than the lower limit provided in the conditional expression (4) is not normally used.

Accordingly, an objective that is configured to satisfy the conditional expression (4) and the conditional expression (5) instead of the conditional expression (2) and includes a first negative lens also has a high NA and can also favorably correct chromatic aberration and off-axis performance.

An objective may be configured to include a cemented triplet lens and to have the second lens group include the first Gauss lens component and the second Gauss lens component instead of satisfying the conditional expression (2). The objective may be configured to include a cemented triplet lens and to have the second lens group include the first Gauss lens component, the third Gauss lens component and the fourth Gauss lens component instead of satisfying the conditional expression (2).

Here, the first Gauss lens component is a meniscus lens component with the concave surface facing toward an image. The second Gauss lens component is arranged closer to the image than the first Gauss lens component is and is a meniscus lens component with the concave surface facing toward an object. The third Gauss lens component is arranged closer to the image than the first Gauss lens component is and is a lens component with the convex surface facing toward an image. The fourth Gauss lens component is arranged between the first Gauss lens component and the third Gauss lens component and is a lens component with the concave surface facing toward an object.

When an objective includes a cemented triplet lens, the cemented triplet lens can act as an achromatic lens component. As a result, chromatic aberration can be effectively corrected while achieving effective utilization of space within the objective. Although the achromatic lens component works effectively when the component is arranged in a region in which the height of a marginal ray is high, a lens component arranged in such a region in which the height of a marginal ray is high has a large lens diameter by necessity. When the achromatic lens component is a cemented triplet lens, sufficient rigidity needed in a lens component with a large lens diameter can be acquired.

When the second lens group has the above-described configuration, the second lens group includes a pair of convex surfaces each facing outward and facing in the direction opposite to each other and a pair of concave surfaces facing each other and being arranged between the pair of convex surfaces. An optical system having such a configuration is generally referred to as Gaussian group. In the Gaussian group, the height of a marginal ray in the pair of concave surfaces facing each other can be lowered. This results in effective correction of the Petzval sum and a field curvature can be made sufficiently small.

Accordingly, an objective that includes a cemented triplet lens and in which the second lens group has the above-described configuration, instead of satisfying the conditional expression (2), also has a high NA and can also favorably correct chromatic aberration and off-axis performance.

Note that the objective may be one that satisfies any combination of the conditional expression (2) to the conditional expression (5) in addition to the conditional expression (1). The objective may also be one that satisfies any combination of the conditional expression (2) to the conditional expression (5) in addition to the conditional expression (1), includes a cemented triplet lens and has the second lens group configured as Gaussian group.

Moreover, the objective may be configured to satisfy the following conditional expression (2-1) or conditional expression (2-2) instead of the conditional expression (2). The objective may also be configured to satisfy the following conditional expression (3-1) or conditional expression (3-2) instead of the conditional expression (3). The objective may also be configured to satisfy the following conditional expression (4-1) instead of the conditional expression (4) and the following conditional expression (5-1) instead of the conditional expression (5).

$$-1.5 \leq \Delta z_1/DOF_e \leq 1.5 \quad (2\text{-}1)$$

$$-1 \leq \Delta z_1/DOF_e \leq 1 \quad (2\text{-}2)$$

$$9.5 \text{ mm} \leq Y_{reso} \times |\beta| \leq 17 \text{ mm} \quad (3\text{-}1)$$

$$10 \text{ mm} \leq Y_{reso} \times |\beta| \leq 15 \text{ mm} \quad (3\text{-}2)$$

$$35 \leq vd_1 \leq 43 \quad (4\text{-}1)$$

$$0.555 \leq \theta gF_1 \leq 0.565 \quad (5\text{-}1)$$

In the following description, a further desirable configuration of an objective is explained. When an objective includes the first negative lens, it is desirable to further include the second negative lens and to satisfy the following conditional expression (6) and conditional expression (7). Note that the second negative lens is a lens that is different from the first negative lens and has a negative refractive power.

$$30 \leq vd_2 \leq 43 \quad (6)$$

$$0.55 \leq \theta gF_2 \leq 0.57 \quad (7)$$

Here, $vd_2$ is the Abbe number of the second negative lens. $\theta gF_2$ is a partial dispersion ratio of the second negative lens. More specifically, the partial dispersion ratio $\theta gF_2$ can be calculated by $(n_g-n_F)/(n_F-n_C)$ where $n_C$ is the refractive index at the C-line, $n_F$ is the refractive index at the F-line, and $n_g$ the refractive index at the g-line. Note that the materials of the second negative lens that satisfies the conditional expression (6) and the conditional expression (7) include S-LAH55V manufactured by OHARA INC. and N-KZFS11 manufactured by SCHOTT AG.

The conditional expression (6) and the conditional expression (7) are conditional expressions for achieving favorable correction of chromatic aberration and their intentions are the same as those of the conditional expression (4) and the conditional expression (5). When an objective includes the second negative lens in addition to the first negative lens, i.e., the objective includes two negative lenses that satisfy prescribed conditions, further favorable correction of chromatic aberration can be achieved.

Note that the objective may be configured to satisfy the following conditional expression (6-1) instead of the conditional expression (6) and the following conditional expression (7-1) instead of the conditional expression (7).

$$35 \leq vd_2 \leq 43 \quad (6\text{-}1)$$

$$0.555 \leq \theta gF_2 \leq 0.565 \quad (7\text{-}1)$$

When an objective includes a cemented triplet lens, the cemented triple lens desirably includes a negative lens and two positive lenses arranged on either side of the negative lens. In other words, the cemented triple lens is desirably a positive-negative-positive cemented triplet lens.

When the cemented triple lens is desirably a positive-negative-positive cemented triplet lens, an effect to correct chromatic aberration will be given to the lens surfaces on either side of the negative lens. For that reason, more effective correction of chromatic aberration can be performed with a cemented triplet lens.

When the objective includes a positive-negative-positive cemented triplet lens, the objective desirably satisfy at least one of the following conditional expression (8) and conditional expression (9). In the other word, the objective desirably satisfy the following conditional expression (8), the objective desirably satisfy the following conditional expression (9), or the objective desirably satisfy the following conditional expressions (8) and (9).

$$1.4 \leq n_{eo} \leq 1.55 \quad (8)$$

$$60 \leq vd_o \leq 80 \quad (9)$$

Here, $n_{eo}$ is a refractive index at the e-line of the negative lens included in the cemented triplet lens. $vd_o$ is an Abbe number of the negative lens included in the cemented triplet lens.

The conditional expression (8) is a conditional expression mainly for reducing generation of spherical aberrations or coma aberrations in a cemented triplet lens. For a positive lens included in a cemented triplet lens, a low dispersion material is usually selected. Therefore, the material of a positive lens has a low refractive index. When the refractive index $n_{eo}$ of the negative lens included in the cemented triplet lens is equal to or lower than the upper limit provided in the conditional expression (8), a difference in refractive indices on each cemented surfaces between the positive lens and the negative lens will not be too large and generation of spherical aberrations and coma aberrations on the cemented surfaces can be reduced. An optical material in which the refractive index nee is lower than the lower limit provided in the conditional expression (8) is rare and use of such an optical material is not preferable from aspect of cost etc.

The conditional expression (9) is a conditional expression mainly for favorably correcting chromatic aberration. A negative lens included in a cemented lens is usually expected to have an effect of chromatic aberration correction. For that reason, in many cases, a low dispersion material is used for a negative lens. However, low dispersion materials, in general, tend to have large partial dispersion at short wavelengths. Based on this point, as long as the Abbe number $vd_o$ of the negative lens does not become lower than the lower limit provided in the conditional expression (9), excessive correction of chromatic aberration can be prevented in a wavelength range from the g-line to ultraviolet. As long as the Abbe number $vd_o$ of the negative lens does not exceed the upper limit provided in the conditional expression (9), chromatic aberration in the visible range can be favorably corrected. Therefore, by satisfying the conditional expression (9), chromatic aberration can be favorably corrected in a wide range of wavelength.

Note that the objective may be configured to satisfy the following conditional expression (8-1) instead of the conditional expression (8). The objective may also be configured to satisfy the following conditional expression (9-1) instead of the conditional expression (9).

$$1.46 \leq n_{eo} \leq 1.51 \tag{8-1}$$

$$65 \leq vd_0 \leq 75 \tag{9-1}$$

When an objective includes the first Gauss lens component, the third Gauss lens component, and the fourth Gauss lens component, the third Gauss lens component and the fourth Gauss lens component are desirably arranged adjacent to each other with an air gap therebetween. With this configuration, the lens surface of the third Gauss lens component on the object side and the lens surface of the fourth Gauss lens component on the image side can independently correct aberration. As a result, off-axis aberrations such as astigmatism and coma aberration can be corrected in a balanced manner.

In an objective, when the third Gauss lens component and the fourth Gauss lens component are arranged adjacent to each other with an air gap therebetween, the objective desirably satisfies the following conditional expression (10).

$$0.005 \leq D_{GM1}/D_{GM2} \leq 0.5 \tag{10}$$

Here, $D_{GM1}$ is a space on the optical axis between the third Gauss lens component and the fourth Gauss lens component. In other words, it is a distance on the optical axis between the object-side lens surface of the third Gauss lens component and the image-side lens surface of the fourth Gauss lens component. $D_{GM2}$ is a distance on the optical axis between the image-side lens surface of the third Gauss lens component and the object-side lens surface of the fourth Gauss lens component.

The conditional expression (10) is a conditional expression mainly for favorably correcting coma aberration. When the space between the third Gauss lens component and the fourth Gauss lens component is too large, a difference in the height of marginal ray between the two components becomes too large, which makes effective correction of coma aberrations particularly difficult. As long as $D_{GM1}/D_{GM2}$ does not exceed the upper limit provided in the conditional expression (10), the space between the third Gauss lens component and the fourth Gauss lens component does not become too large, and coma aberration can be favorably corrected. Furthermore, as long as $D_{GM1}/D_{GM2}$ does not become lower than the lower limit provided in the conditional expression (10), interference and collision of the third Gauss lens component and the fourth Gauss lens component can be prevented.

Note that the objective may be configured to satisfy the following conditional expression (10-1) instead of the conditional expression (10).

$$0.005 \leq D_{GM1}/D_{GM2} \leq 0.45 \tag{10-1}$$

When the objective includes the first Gauss lens component, the first Gauss lens component is desirably a cemented doublet lens. It is further desirable that the objective satisfies the following conditional expression (11).

$$-3 \leq R_{cem}/D_{Go} \leq -0.5 \tag{11}$$

Here, $R_{cem}$ is a radius of curvature of a cemented surface of the cemented doublet lens. $D_{Go}$ is the thickness of the cemented doublet lens on the optical axis.

When the first Gauss lens component is a cemented doublet lens, an effect to correct chromatic aberration and coma aberration will be given to the first Gauss lens component. In particular, when an effect to correct coma aberration is given to a cemented surface that has a chromatic-aberration correcting effect, coma aberration that is different for each wavelength can be corrected. As a result, favorable correction of coma aberration can be realized at each wavelength.

The conditional expression (11) is a conditional expression mainly for favorably correcting coma aberration. As long as $R_{cem}/D_{Go}$ does not exceed the upper limit provided in the conditional expression (11), the absolute value of the radius of curvature of the cemented surface does not become too small, and sufficient processability can be acquired. Furthermore, as long as $R_{cem}/D_{Go}$ does not become lower than the lower limit provided in the conditional expression (11), the cemented surface will have a sufficient refractive power, which enables sufficient correction of coma aberration.

Note that the objective may be configured to satisfy the following conditional expression (11-1) instead of the conditional expression (11).

$$-2.5 \leq R_{cem}/D_{Go} \leq -0.7 \tag{11-1}$$

The objective desirably includes the first lens component that is arranged closest to the object and has a meniscus lens shape with the concave surface facing the object side and satisfy the conditional expression (12).

$$-3 \leq D_1/R_{12} \leq -0.75 \tag{12}$$

Here, $D_1$ is the thickness of the first lens component on the optical axis. $R_{12}$ is a radius of curvature of the lens surface closest to the image in the first lens component.

When the first lens component arranged closest to the object has a meniscus lens shape with the concave surface facing the object side, the first lens component can reduce generation of spherical aberrations and coma aberrations and can correct a field curvature by favorably correcting the Petzval sum.

The conditional expression (12) is a conditional expression for achieving both favorable correction of a field curvature and favorable correction of spherical aberrations and coma aberrations. In order to favorably correct the Petzval sum, a certain thickness is needed in the first lens component. As long as $D_1/R_{12}$ does not exceed the upper limit provided in the conditional expression (12), the absolute value of the radius of curvature of the lens surface arranged closest to the image in the first lens component does not become too large with respect to the thickness of the first lens component. For that reason, since the positive refractive power of the lens surface closest to the image works on a divergent pencil of light in which the height of marginal ray increased in the first lens component, divergence of exiting light can be kept small. Consequently, the height of marginal ray can be kept low and a divergence angle of marginal ray can be kept small when the light enters optical systems subsequent to the first lens component. As a result, generation of spherical aberrations and coma aberrations in the optical systems to which the light enters after the first lens component can be reduced. Furthermore, as long as $D_1/R_{12}$ does not become lower than the lower limit provided in the conditional expression (12), the absolute value of the radius of curvature of the lens surface arranged closest to the image in the first lens component does not become too small with respect to the thickness of the first lens component. For that reason, generation of spherical aberrations and coma aberrations in the lens surface on image side of the first lens component can be reduced.

Note that the objective may be configured to satisfy the following conditional expression (12-1) or conditional expression (12-2) instead of the conditional expression (12).

$$-2.5 \leq D_1/R_{12} \leq -0.8 \quad (12\text{-}1)$$

$$-2 \leq D_1/R_{12} \leq -0.95 \quad (12\text{-}2)$$

When the objective includes the above-described first lens component, it is desirable to further include the second lens component that is arranged on the image side of the first lens component, has a positive refractive power, and has a meniscus shape with the concave surface facing the object side.

When the second lens component arranged on the image side of the first lens component has a meniscus shape with the concave surface facing the object side, generation of spherical aberrations and coma aberrations can be further reduced.

In the objective, the moving lens component desirably satisfy at least one of the following conditional expression (13) and conditional expression (14). In the other word, the objective desirably satisfy the following conditional expression (13), the objective desirably satisfy the following conditional expression (14), or the objective desirably satisfy the following conditional expressions (13) and (14).

$$0.5 \leq M_{UC} \leq 2 \quad (13)$$

$$-0.3 \leq f/f_{UC} \leq 0.3 \quad (14)$$

Here, $M_{UC}$ is a magnification of the moving lens component, or more specifically is a magnification of a single moving lens component. When the objective includes plural moving lens components that move independently from one another, $M_{UC}$ is a magnification of one of the plural moving lens components. Note that when the objective includes plural moving lens components that move in conjunction with one another along with the optical axis, $M_{UC}$ may be a composite magnification of the plural moving lens components. f is a focal length of the objective. $f_{UC}$ is a focal length of the moving lens component.

Figure 2A:
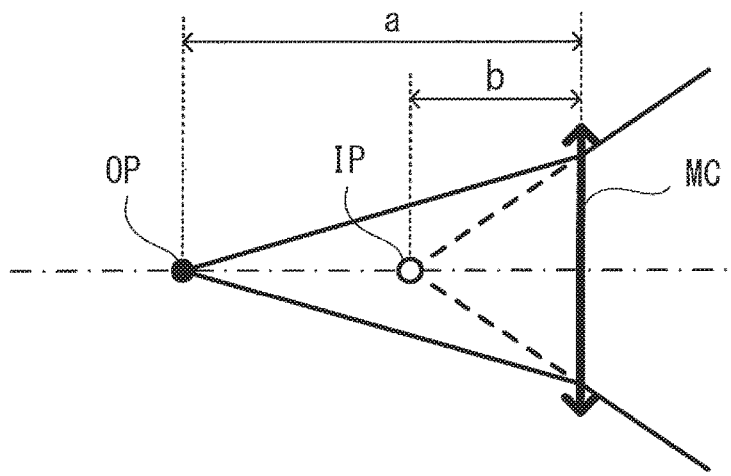
FIG. 2A to FIG. 2C are diagrams for explaining a magnification of a moving lens component.
Figure 2B:
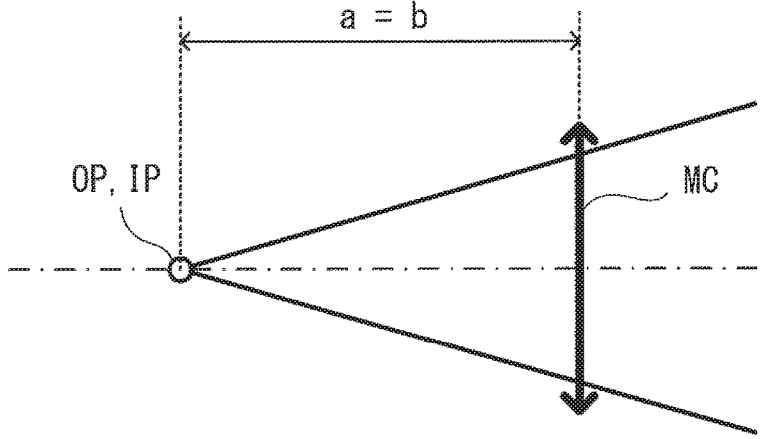
Figure 2C:
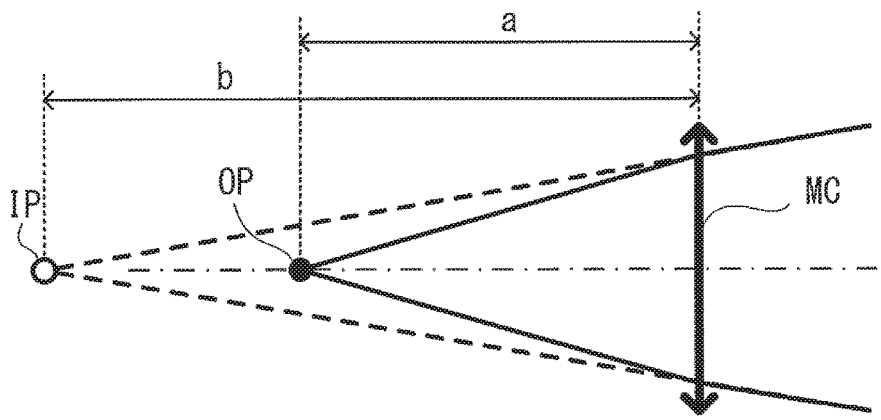

As illustrated in FIG. 2A to FIG. 2C, the magnification $M_{UC}$ is defined by the ratio (=b/a) of a length b from a main plane of the moving lens component MC to an image point IP (in this example, an image point of a virtual image), which is formed by the moving lens component MC, to a length a from a main plane of the moving lens component MC to an object point OP, which is defined with respect to a pencil of light entering into the moving lens component MC. FIG. 2A illustrates a case in which the moving lens component has a negative refractive power. In this case, the magnification $M_{UC}$ of the moving lens component satisfies a relationship of $0<M_{UC}<1$. FIG. 2B illustrates a case in which the moving lens component does not have a refractive power. In this case, the magnification $M_{UC}$ of the moving lens component satisfies a relationship of $M_{UC}=1$. FIG. 2C illustrates a case in which the moving lens component has a positive refractive power. In this case, the magnification $M_{UC}$ of the moving lens component satisfies a relationship of $1<M_{UC}$.

Note that, in a precise sense, the magnification of the moving lens component changes in accordance with the position of the moving lens component within the objective. Here, the moving lens component satisfying the conditional expression (13) means that the moving lens component satisfies the conditional expression (13) at least at one position within the range of movement.

The conditional expression (13) is a conditional expression for reducing variation of focus position. The moving lens component is for correcting spherical aberrations, and variation of focus position caused by the movement is not preferable. When the magnification $M_{UC}$ of the moving lens component does not exceed the upper limit provided in the conditional expression (13) and does not become lower than the lower limit, variation of focus position caused by the movement of the moving lens component can be reduced.

The conditional expression (14) is a conditional expression for reducing the variation of focus position. In order to reduce the variation of focus position cause by the movement of the moving lens component, the magnification of the moving lens component is desirably brought closer to 1. In order to do that, a large absolute value of the focal length of the moving lens component is desirable. When $f/f_{UC}$ does not exceed the upper limit provided in the conditional expression (14) and does not become lower than the lower limit, the absolute value of the focal length of the moving lens component becomes sufficiently large. In this manner, variation of focus position caused by the movement of the moving lens component can be reduced.

Note that the objective may be configured to satisfy the following conditional expression (13-1) instead of the conditional expression (13). In addition, the objective may be configured to satisfy the following conditional expression (14-1) or conditional expression (14-2) instead of the conditional expression (14).

$$0.7 \leq M_{UC} \leq 1.3 \quad (13\text{-}1)$$

$$-0.2 \leq f/f_{UC} \leq 0.2 \quad (14\text{-}1)$$

$$-0.1 \leq f/f_{UC} \leq 0.1 \quad (14\text{-}2)$$

The moving lens component desirably has a meniscus lens shape with the concave surface facing the object side. When the moving lens component has a meniscus shape with the concave surface facing the object side, generation of coma aberration in the moving lens component can be reduced. For that reason, variation of coma aberration caused by the movement of the moving lens component can be reduced.

In the following description, the embodiments of the above-described objective are explained in detail.

Embodiment 1

Figure 3:
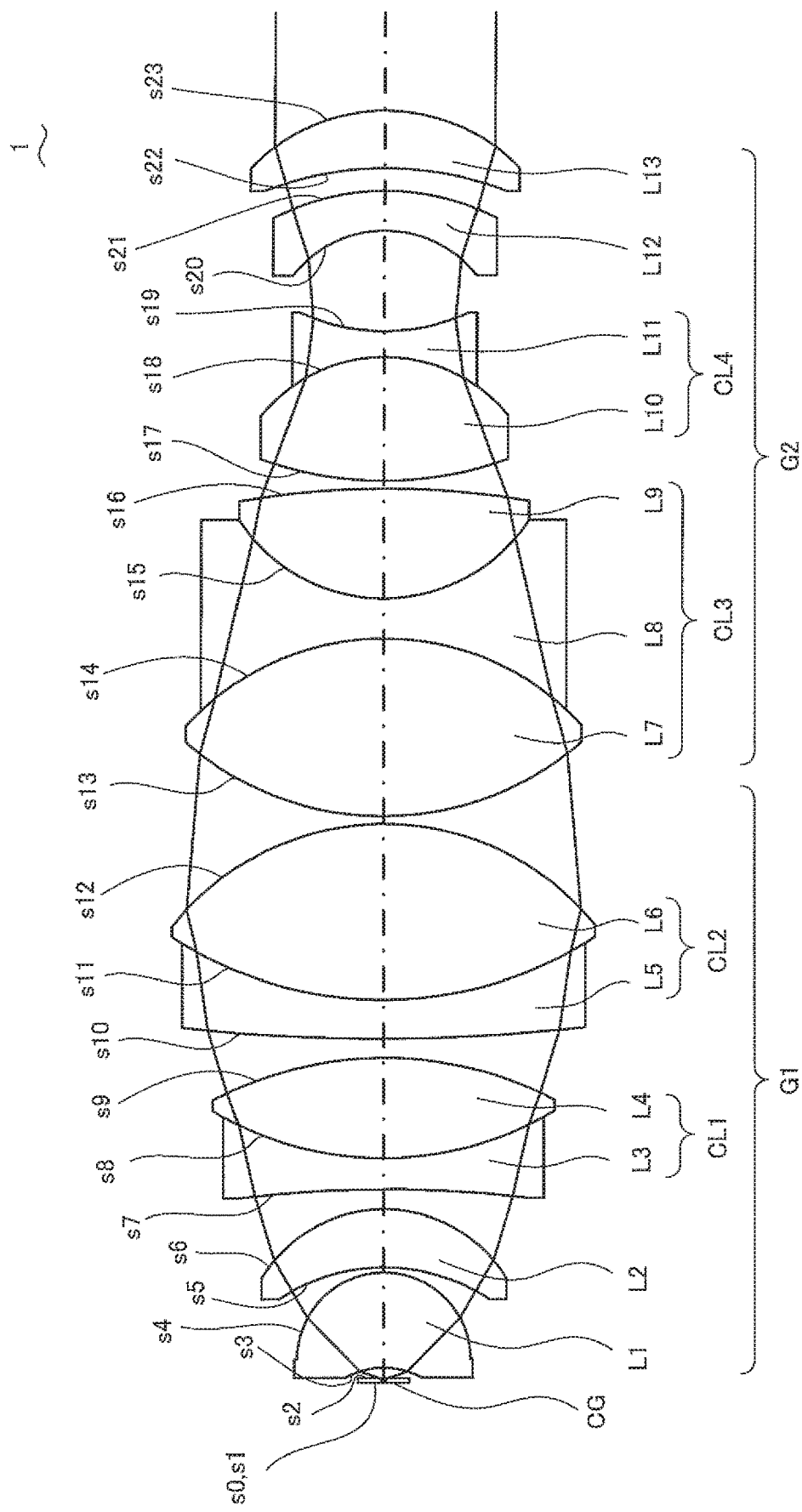
FIG. 3 is a cross-sectional view of the objective 1 according to Embodiment 1 of the present invention.

FIG. 3 is a cross-sectional view of an objective 1 according to the present embodiment. The objective 1 includes a first lens group G1 that has a positive refractive power, which converts a divergent pencil of light from an object point into a convergent pencil of light, and a second lens group G2 that has a negative refractive power and is arranged closer to an image than the first lens group G1 is. Note that the objective 1 is a dry objective for a microscope.

The first lens group G1 includes a lens L1 (first lens component) having a meniscus shape with the concave surface facing an object side, a lens L2 (second lens component) having a meniscus shape with the concave surface facing the object side, a cemented lens CL1, and a cemented lens CL2, and these lenses are arranged in this order from the object side.

The lens L2 has a positive refractive power. The cemented lens CL1 is a moving lens component that moves along the optical axis. The cemented lens CL1 is a cemented doublet lens consisting of a biconcave lens L3 (first negative lens) and a biconvex lens L4 and has a meniscus shape with the concave surface facing the object side. The cemented lens CL2 is a cemented doublet lens consisting of a meniscus lens L5 with the concave surface facing the image side and a biconvex lens L6 and has a biconvex lens shape.

The second lens group G2 includes a cemented lens CL3, a cemented lens CL4, a lens L12 having a meniscus shape with the concave surface facing the object side, and a lens L13 having a meniscus shape with the concave surface facing the object side and these lenses are arranged in this order from the object side.

The cemented lens CL3 is a cemented triplet lens consisting of a biconvex lens L7, a biconcave lens L8, and a biconvex lens L9. In other words, it is a positive-negative-positive cemented triplet lens including a negative lens (the biconcave lens L8) and positive lenses (the biconvex lens L7 and the biconvex lens L9) arranged on either side of the negative lens. The cemented lens CL4 is a cemented doublet lens consisting of a biconvex lens L10 and a biconcave lens L11 and is a meniscus lens component (first Gauss lens component) with the concave surface facing the image side. The lens L13 is a lens component (third Gauss lens component) with the convex surface facing the image side and is arranged closer to the image than the cemented lens CL4 is. The lens L12 is a lens component (fourth Gauss lens component) with the concave surface facing the object side and is arranged between the cemented lens CL4 and the lens L13. The lens L12 and the lens L13 are arranged adjacent to each other with an air gap therebetween.

Specific data of the objective 1 is provided below. Here, $f_{G1}$ and $f_{G2}$ are a focal length of the first lens group and a focal length of the second lens group, respectively. $|\beta|$ is a magnification when the objective 1 is used in combination with a tube lens having a focal length of 180 mm.

$NA_{ob}$=0.95, $\Delta z_1$=−0.04 μm, $DOF_e$=0.30 μm, $Y_{reso}$=0.29 mm, $|\beta|$=40, $vd_1$=42.41, $\theta gF_1$=0.561, $vd_2$=(NA), $\theta gF_2$=(NA), $n_{eo}$=1.48915, $vd_0$=70.23, $D_{GM1}$=0.873 mm, $D_{GM2}$=4.633 mm, $R_{cem}$=−6.1667 mm, $D_{Go}$=5.787 mm, $D_1$=3.681 mm, $R_{12}$=−3.3487 mm, $M_{UC}$=1.18, f=4.500 mm, $f_{UC}$=259.55 mm, $f_{G1}$=7.131 mm, $f_{G2}$=−125.177 mm The lens data of the objective 1 is provided below. Note that INF in the lens data denotes infinity (∞).

Objective 1

| s | r | d | ne | nh | vd |
|---|---|---|----|----|-----|
| 0 | INF | | | | |
| 1 | INF | t | 1.52626 | 1.54042 | 54.41 |
| 2 | INF | D2 | | | |
| 3 | −3.0339 | 3.681 | 1.77621 | 1.79917 | 49.6 |
| 4 | −3.3487 | 0.200 | | | |
| 5 | −7.2937 | 2.241 | 1.57098 | 1.58258 | 71.3 |
| 6 | −5.5255 | D6 | | | |
| 7 | −45.764 | 1.200 | 1.64132 | 1.66385 | 42.41 |
| 8 | 12.7782 | 3.875 | 1.43986 | 1.44647 | 94.66 |
| 9 | −14.198 | D9 | | | |
| 10 | 71.1197 | 1.500 | 1.61664 | 1.63723 | 44.49 |
| 11 | 15.0477 | 6.788 | 1.43986 | 1.44647 | 94.66 |
| 12 | −10.4578 | 0.300 | | | |
| 13 | 11.6236 | 6.847 | 1.43986 | 1.44647 | 94.66 |
| 14 | −10.3782 | 1.550 | 1.48915 | 1.49898 | 70.23 |
| 15 | 6.6859 | 4.219 | 1.43986 | 1.44647 | 94.66 |
| 16 | −32.513 | 0.300 | | | |
| 17 | 13.9497 | 4.787 | 1.49846 | 1.5072 | 81.54 |
| 18 | −6.1667 | 1.000 | 1.88815 | 1.92092 | 40.76 |
| 19 | 7.744 | 3.857 | | | |
| 20 | −4.5391 | 1.541 | 1.51825 | 1.52977 | 64.14 |
| 21 | −9.3597 | 0.873 | | | |
| 22 | −12.8369 | 2.219 | 1.7434 | 1.77943 | 32.33 |
| 23 | −7.2219 | | | | |

Here, s denotes a surface number, r denotes a radius of curvature (mm), d denotes a surface interval (mm), ne denotes a refractive index at the e-line, nh denotes a refractive index at the h-line, and vd denotes an Abbe number. The same symbols are used in the following embodiments. Note that the surfaces denoted by the surface numbers s0, s1, and s2 are an object surface, a surface of a cover glass CG on the object side, and a surface of the cover glass CG on an image side, respectively. The surfaces denoted by the surface numbers s3, and s23 are a lens surface of the objective 1 closest to the object and a lens surface of the objective 1 closest to the image, respectively. In addition, the surface interval d1 denotes a distance on the optical axis from a surface indicated by the surface number s1 to a surface indicated by the surface number s2.

A surface interval t between the surface number s1 and the surface number s2 is the thickness of the cover glass CG and is a variable amount that changes in accordance with the cover glass CG. A surface interval D2 between the surface number s2 and the surface number s3 is an air space between the cover glass CG and the objective 1 and is a variable amount that changes in accordance with the cover glass CG. A surface interval D6 between the surface number s6 and the surface number s7 and a surface interval D9 between the surface number s9 and the surface number s10 are air spaces between a moving lens component and a lens component adjacent to the moving lens component and is a variable amount that changes in accordance with a position of the moving lens component. The position of the moving lens component is adjusted in accordance with the thickness of the cover glass CG as an example.

The relationship between the above-mentioned variable amounts are provided below.

| | t (thickness of CG) | | |
|---|---|---|---|
| | 0.17 | 0.11 | 0.23 |
| D2 | 0.411 | 0.441 | 0.382 |
| D6 | 0.766 | 1.178 | 0.330 |
| D9 | 0.742 | 0.330 | 1.178 |

As described below, the objective 1 satisfies the conditional expressions (1) to (14) except the conditional expressions (6) and (7).

$NA_{ob}=0.95$ (1)

$\Delta z_1/DOF_e=-0.13$ (2)

$Y_{reso} \times |\beta|=11.6$ mm (3)

$vd_1=42.41$ (4)

$\theta gF_1=0.561$ (5)

$vd_2=(NA)$ (6)

$\theta gF_2=(NA)$ (7)

$n_{eo}=1.48915$ (8)

$vd_o=70.23$ (9)

$D_{GM1}/D_{GM2}=0.19$ (10)

$R_{cem}/D_{Go}=-1.07$ (11)

$D_1/R_{12}=-1.10$ (12)

$M_{UC}=1.18$ (13)

$f/f_{UC}=0.017$ (14)

Figures 4A, 4B, 4C, 4D:
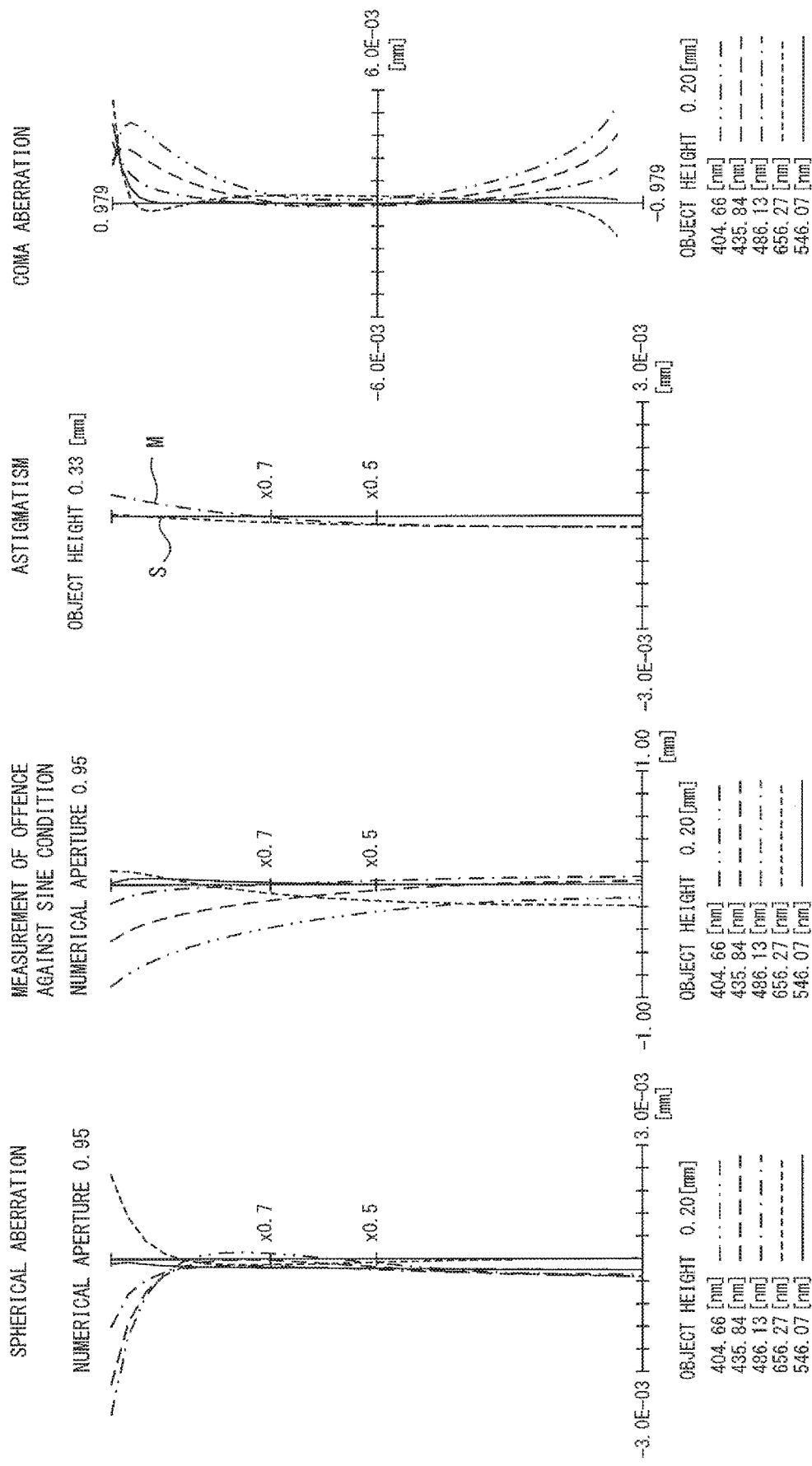
FIG. 4A to FIG. 4D are diagrams of aberrations of the objective 1 illustrated in FIG. 3.

FIG. 4A to FIG. 4D are diagrams illustrating aberration when the thickness t of cover glass of the objective 1 illustrated in FIG. 3 is 0.17 mm. FIG. 4A to FIG. 4D illustrate aberration on an object surface when an infinite distant light flux enters from the image side. FIG. 4A is a diagram illustrating a spherical aberration, FIG. 4B is a diagram illustrating a measurement of offence against sine condition, FIG. 4C is a diagram illustrating an astigmatism, and FIG. 4D is a diagram illustrating a coma aberration at a position at which an object height ratio is 0.6 (object height 0.2 mm). Note that in the diagrams, "M" denotes a meridional component and "S" denotes a sagittal component. As illustrated in FIG. 4A to FIG. 4D, in the present embodiment, aberrations are favorably corrected across a wide field of view.

Embodiment 2

Figure 5:
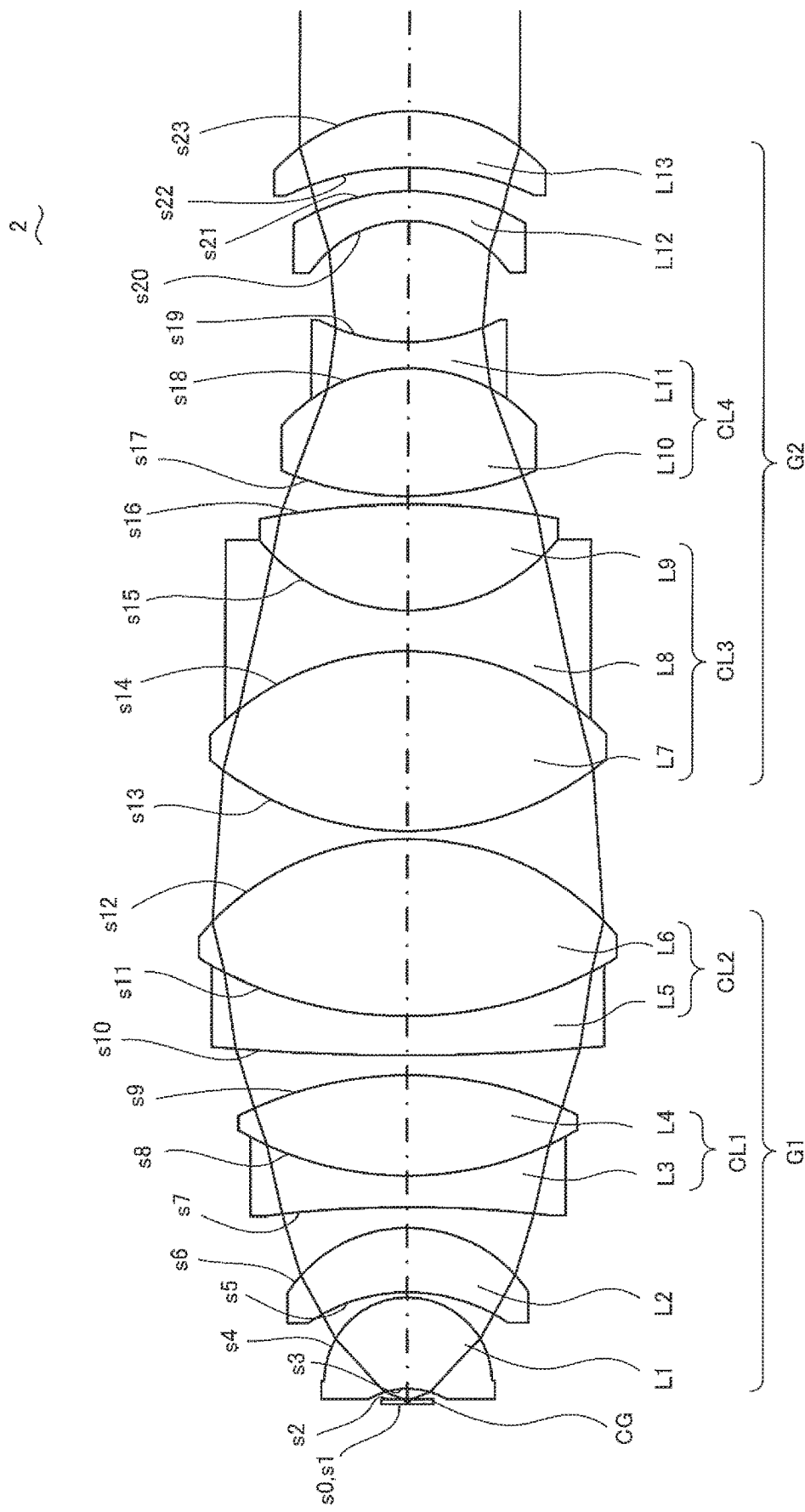
FIG. 5 is a cross-sectional view of the objective 2 according to Embodiment 2 of the present invention.

FIG. 5 is a cross-sectional view of an objective 2 according to the present embodiment. The objective 2 includes a first lens group G1 that has a positive refractive power, which converts a divergent pencil of light from an object point into a convergent pencil of light, and a second lens group G2 that has a negative refractive power and is arranged closer to an image than the first lens group G1 is. Note that the objective 2 is a dry objective for a microscope.

The first lens group G1 includes a lens L1 (first lens component) having a meniscus shape with the concave surface facing an object side, a lens L2 (second lens component) having a meniscus shape with the concave surface facing the object side, a cemented lens CL1, and a cemented lens CL2, and these lenses are arranged in this order from the object side.

The lens L2 has a positive refractive power. The cemented lens CL1 is a moving lens component that moves along the optical axis. The cemented lens CL1 is a cemented doublet lens consisting of a biconcave lens L3 (first negative lens) and a biconvex lens L4 and has a meniscus shape with the concave surface facing the object side. The cemented lens CL2 is a cemented doublet lens consisting of a meniscus lens L5 with the concave surface facing the image side and a biconvex lens L6 and has a biconvex lens shape.

The second lens group G2 includes a cemented lens CL3, a cemented lens CL4, a lens L12 having a meniscus shape with the concave surface facing the object side, and a lens L13 having a meniscus shape with the concave surface facing the object side, and these lenses are arranged in this order from the object side.

The cemented lens CL3 is a cemented triplet lens consisting of a biconvex lens L7, a biconcave lens L8, and a biconvex lens L9. In other words, it is a positive-negative-positive cemented triplet lens including a negative lens (the biconcave lens L8) and positive lenses (the biconvex lens L7 and the biconvex lens L9) arranged on either side of the negative lens. The cemented lens CL4 is a cemented doublet lens consisting of a biconvex lens L10 and a biconcave lens L11 and is a meniscus lens component (first Gauss lens component) with the concave surface facing the image side. The lens L13 is a lens component (third Gauss lens component) with the convex surface facing the image side and is arranged closer to the image than the cemented lens CL4 is. The lens L12 is a lens component (fourth Gauss lens component) with the concave surface facing the object side and is arranged between the cemented lens CL4 and the lens L13. The lens L12 and the lens L13 are arranged adjacent to each other with an air gap therebetween.

Specific data of the objective 2 is provided below. Here, $f_{G1}$ and $f_{G2}$ are a focal length of the first lens group and a focal length of the second lens group, respectively. $|\beta|$ is a magnification when the objective 2 is used in combination with a tube lens having a focal length of 180 mm.

$NA_{ob}=0.93$, $\Delta z_1=0.03$ μm, $DOF_e=0.32$ μm, $Y_{reso}=0.29$ mm, $|\beta|=40$, $vd_1=42.41$, $\theta gF_1=0.561$, $vd_2=(NA)$, $\theta gF_2=(NA)$, $n_{eo}=1.48915$, $vd_0=70.23$, $D_{GM1}=0.893$ mm, $D_{GM2}=4.184$ mm, $R_{cemo}=-6.494$ mm, $D_{Go}=5.859$ mm, $D_1=3.470$ mm, $R_{12}=-3.173$ mm, $M_{UC}=1.17$, $f=4.500$ mm, $f_{UC}=278.085$ mm, $f_{G1}=7.184$ mm, $f_{G2}=-168.383$ mm The lens data of the objective 2 is provided below. Note that INF in the lens data denotes infinity (∞).

Objective 2

| s | r | d | ne | nh | vd |
|---|---|---|---|---|---|
| 0 | INF | | | | |
| 1 | INF | t | 1.52626 | 1.54042 | 54.41 |
| 2 | INF | D2 | | | |
| 3 | −2.9851 | 3.470 | 1.77621 | 1.79917 | 49.6 |
| 4 | −3.173 | 0.200 | | | |
| 5 | −6.7497 | 2.453 | 1.57098 | 1.58258 | 71.3 |
| 6 | −5.4784 | D6 | | | |
| 7 | −45.6337 | 1.200 | 1.64132 | 1.66385 | 42.41 |
| 8 | 12.9024 | 3.819 | 1.43986 | 1.44647 | 94.66 |
| 9 | −14.336 | D9 | | | |
| 10 | 85.7763 | 1.500 | 1.61664 | 1.63723 | 44.49 |
| 11 | 15.5448 | 6.717 | 1.43986 | 1.44647 | 94.66 |
| 12 | −10.4133 | 0.300 | | | |
| 13 | 11.828 | 6.821 | 1.43986 | 1.44647 | 94.66 |
| 14 | −10.5608 | 1.550 | 1.48915 | 1.49898 | 70.23 |
| 15 | 7.3633 | 4.019 | 1.43986 | 1.44647 | 94.66 |
| 16 | −29.839 | 0.300 | | | |
| 17 | 12.5725 | 4.859 | 1.43986 | 1.44647 | 94.66 |
| 18 | −6.494 | 1.000 | 1.83945 | 1.86892 | 42.74 |
| 19 | 7.4458 | 4.570 | | | |
| 20 | −4.6923 | 1.139 | 1.48915 | 1.49898 | 70.23 |
| 21 | −8.5 | 0.893 | | | |
| 22 | −11.0502 | 2.152 | 1.7434 | 1.77943 | 32.33 |
| 23 | −7.0354 | | | | |

Note that the surfaces denoted by the surface numbers s0, s1, and s2 are an object surface, a surface of a cover glass CG on the object side, and a surface of the cover glass CG on an image side, respectively. The surfaces denoted by the surface numbers s3, and s23 are a lens surface of the objective 2 closest to the object and a lens surface of the objective 2 closest to the image, respectively.

A surface interval t between the surface number s1 and the surface number s2 is the thickness of the cover glass CG and is a variable amount that changes in accordance with the cover glass CG. A surface interval D2 between the surface number s2 and the surface number s3 is an air space between the cover glass CG and the objective 2 and is a variable amount that changes in accordance with the cover glass CG. A surface interval D6 between the surface number s6 and the surface number s7 and a surface interval D9 between the surface number s9 and the surface number s10 are air spaces between a moving lens component and a lens component adjacent to the moving lens component and is a variable amount that changes in accordance with a position of the moving lens component. The position of the moving lens component is adjusted in accordance with the thickness of the cover glass CG as an example.

The relationship between the above-mentioned variable amounts are provided below.

| | t (thickness of CG) | | |
|---|---|---|---|
| | 0.17 | 0.11 | 0.23 |
| D2 | 0.412 | 0.441 | 0.383 |
| D6 | 0.771 | 1.190 | 0.330 |
| D9 | 0.749 | 0.330 | 1.190 |

As described below, the objective 2 satisfies the conditional expressions (1) to (14) except the conditional expressions (6) and (7).

$$NA_{ob}=0.93 \tag{1}$$

$$\Delta z_1/DOF_e=0.10 \tag{2}$$

$$Y_{reso} \times |\beta|=11.6 \text{ mm} \tag{3}$$

$$vd_1=42.41 \tag{4}$$

$$\theta gF_1=0.561 \tag{5}$$

$$vd_2=(NA) \tag{6}$$

$$\theta gF_2=(NA) \tag{7}$$

$$n_{eo}=1.48915 \tag{8}$$

$$vd_o=70.23 \tag{9}$$

$$D_{GM1}/D_{GM2}=0.21 \tag{10}$$

$$R_{cem}/D_{Go}=-1.11 \tag{11}$$

$$D_1/R_{12}=-1.09 \tag{12}$$

$$M_{UC}=1.17 \tag{13}$$

$$f/f_{UC}=0.016 \tag{14}$$

Figure 6:
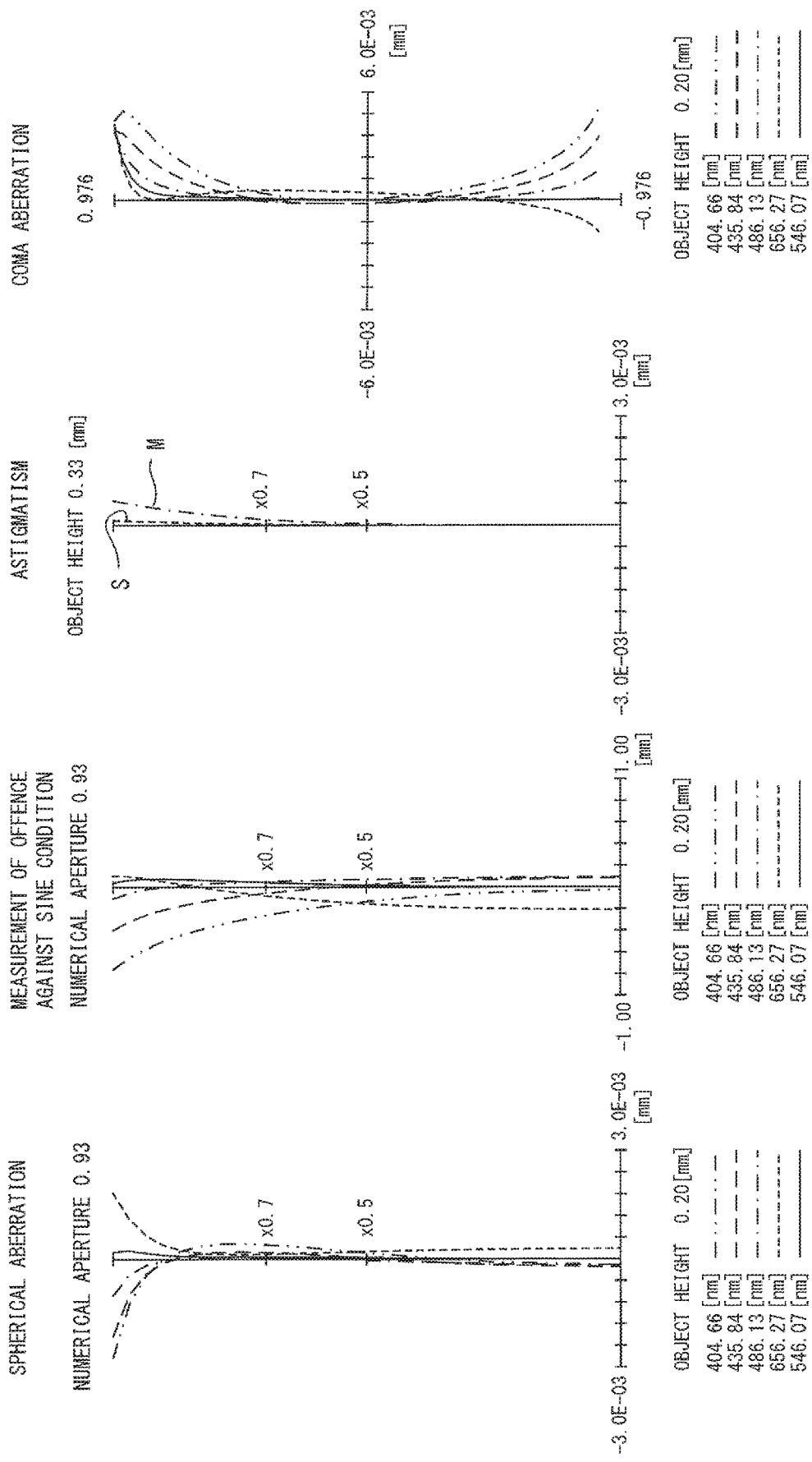
FIG. 6A to FIG. 6D are diagrams of aberrations of the objective 2 illustrated in FIG. 5.

FIG. 6A to FIG. 6D are diagrams illustrating aberration when the thickness t of cover glass of the objective 2 illustrated in FIG. 5 is 0.17 mm. FIG. 6A to FIG. 6D illustrate aberration on an object surface when an infinite distant light flux enters from the image side. FIG. 6A is a diagram illustrating a spherical aberration, FIG. 6B is a diagram illustrating a measurement of offence against sine condition, FIG. 6C is a diagram illustrating an astigmatism, and FIG. 6D is a diagram illustrating a coma aberration at a position at which an object height ratio is 0.6 (object height 0.2 mm). Note that in the diagrams, "M" denotes a meridional component and "S" denotes a sagittal component. As illustrated in FIG. 6A to FIG. 6D, in the present embodiment, aberrations are favorably corrected across a wide field of view.

Embodiment 3

FIG. 7 is a cross-sectional view of an objective 3 according to the present embodiment. The objective 3 includes a first lens group G1 that has a positive refractive power, which converts a divergent pencil of light from an object point into a convergent pencil of light, and a second lens group G2 that has a negative refractive power and is arranged closer to an image than the first lens group G1 is. Note that the objective 3 is a dry objective for a microscope.

The first lens group G1 includes a lens L1 (first lens component) having a meniscus shape with the concave surface facing the object side, a lens L2 (second lens component) having a meniscus shape with the concave surface facing the object side, a cemented lens CL1, a cemented lens CL2, and a biconvex lens L7, and these lenses are arranged in this order from an object side.

The lens L2 has a positive refractive power. The cemented lens CL1 is a moving lens component that moves along the optical axis. The cemented lens CL1 is a cemented doublet lens consisting of a biconcave lens L3 (first negative lens) and a biconvex lens L4 and has a meniscus shape with the concave surface facing the object side. The cemented lens CL2 is a cemented doublet lens consisting of a biconcave lens L5 (second negative lens) and a biconvex lens L6 and has a meniscus lens shape with the concave surface facing the object side.

The second lens group G2 includes a cemented lens CL3, a cemented lens CL4, a lens L12 having a meniscus shape with the concave surface facing the object side, and a lens L13 having a meniscus shape with the concave surface facing the object side and these lenses are arranged in this order from the object side.

The cemented lens CL3 is a cemented doublet lens consisting of a meniscus lens L8 with the concave surface facing the image side and a biconvex lens L9 and has a biconvex lens shape. The cemented lens CL4 is a cemented doublet lens consisting of a biconvex lens L10 and a biconcave lens L11 and is a meniscus lens component (first Gauss lens component) with the concave surface facing the image side. The lens L13 is a lens component (third Gauss lens component) with the convex surface facing the image side and is arranged closer to the image than the cemented lens CL4 is. The lens L12 is a lens component (fourth Gauss lens component) with the concave surface facing the object side and is arranged between the cemented lens CL4 and the lens L13. The lens L12 and the lens L13 are arranged adjacent to each other with an air gap therebetween.

Specific data of the objective 3 is provided below. Here, $f_{G1}$ and $f_{G2}$ is a focal length of the first lens group and a focal length of the second lens group, respectively. $|\beta|$ is a magnification when the objective 3 is used in combination with a tube lens having a focal length of 180 mm.

$NA_{ob}$=0.93, $\Delta z_1$=0.03 μm, $DOF_e$=0.32 μm, $Y_{reso}$=0.29 mm, $|\beta|$=40, $vd_1$=42.41, $\theta gF_1$=0.561, $vd_2$=42.41, $\theta gF_2$=0.561, $n_{eo}$=(NA), $vd_o$=(NA), $D_{GM1}$=1.985 mm, $D_{GM2}$=5.465 mm, $R_{cem}$=-9.8031 mm, $D_{Go}$=6.380 mm, $D_1$=3.049 mm, $R_{12}$=-2.5241 mm, $M_{UC}$=1.13, f=4.500 mm, $f_{UC}$=172.704 mm, $f_{G1}$=7.173 mm, $f_{G2}$=-39.987 mm The lens data of the objective 3 is provided below. Note that INF in the lens data denotes infinity (∞)

Objective 3

| s | r | d | ne | nh | νd |
|---|---|---|---|---|---|
| 0 | INF | | | | |
| 1 | INF | t | 1.52626 | 1.54042 | 54.41 |
| 2 | INF | D2 | | | |
| 3 | −2.5241 | 3.049 | 1.77621 | 1.79917 | 49.6 |
| 4 | −2.7056 | 0.200 | | | |
| 5 | −23.066 | 1.991 | 1.43985 | 1.44645 | 94.93 |
| 6 | −10.6072 | D6 | | | |
| 7 | −698.7307 | 1.200 | 1.64132 | 1.66385 | 42.41 |
| 8 | 12.9772 | 3.010 | 1.43985 | 1.44645 | 94.93 |
| 9 | −20.4682 | D9 | | | |
| 10 | −1734.7605 | 1.500 | 1.64132 | 1.66385 | 42.41 |
| 11 | 17.2319 | 6.133 | 1.43985 | 1.44645 | 94.93 |
| 12 | −9.6242 | 0.196 | | | |
| 13 | 34.1927 | 2.402 | 1.43985 | 1.44645 | 94.93 |
| 14 | −39.0636 | 0.196 | | | |
| 15 | 27.0695 | 1.550 | 1.74435 | 1.76491 | 52.64 |
| 16 | 8.4461 | 5.301 | 1.43985 | 1.44645 | 94.93 |
| 17 | −18.1577 | 3.648 | | | |
| 18 | 10.0874 | 5.380 | 1.57098 | 1.58258 | 71.3 |
| 19 | −9.8031 | 1.000 | 1.64132 | 1.66385 | 42.41 |
| 20 | 5.6909 | 2.985 | | | |
| 21 | −4.8862 | 1.129 | 1.75844 | 1.77954 | 52.32 |
| 22 | −28.3272 | 1.985 | | | |
| 23 | −12.2198 | 2.351 | 1.74341 | 1.77951 | 32.26 |
| 24 | −6.6782 | | | | |

Note that the surfaces denoted by the surface numbers s0, s1, and s2 are an object surface, a surface of a cover glass CG on the object side, and a surface of the cover glass CG on an image side, respectively. The surfaces denoted by the surface numbers s3, and s24 are a lens surface of the objective 3 closest to the object and a lens surface of the objective 3 closest to the image, respectively.

A surface interval t between the surface number s1 and the surface number s2 is the thickness of the cover glass CG and is a variable amount that changes in accordance with the cover glass CG. A surface interval D2 between the surface number s2 and the surface number s3 is an air space between the cover glass CG and the objective 3 and is a variable amount that changes in accordance with the cover glass CG. A surface interval D6 between the surface number s6 and the surface number s7 and a surface interval D9 between the surface number s9 and the surface number s10 are air spaces between a moving lens component and a lens component adjacent to the moving lens component and is a variable amount that changes in accordance with a position of the moving lens component. The position of the moving lens component is adjusted in accordance with the thickness of the cover glass CG as an example.

The relationship between the above-mentioned variable amounts are provided below.

| | t (thickness of CG) | | |
|---|---|---|---|
| | 0.17 | 0.11 | 0.23 |
| D2 | 0.470 | 0.496 | 0.445 |
| D6 | 0.940 | 1.466 | 0.341 |
| D9 | 0.867 | 0.341 | 1.466 |

As described below, the objective 3 satisfies the conditional expressions (1) to (14) except the conditional expressions (8) and (9).

$NA_{ob}=0.93$ (1)

$\Delta z_1/DOF_e=0.10$ (2)

$Y_{reso}\times|\beta|=11.6$ mm (3)

$\nu d_1=42.41$ (4)

$\theta gF_1=0.561$ (5)

$\nu d_2=42.41$ (6)

$\theta gF_2=0.561$ (7)

$n_{eo}=(NA)$ (8)

$\nu d_o=(NA)$ (9)

$D_{GM1}/D_{GM2}=0.36$ (10)

$R_{cem}/D_{Go}=-1.54$ (11)

$D_1/R_{12}=-1.21$ (12)

$M_{UC}=1.13$ (13)

$f/f_{UC}=0.026$ (14)

Figure 8:
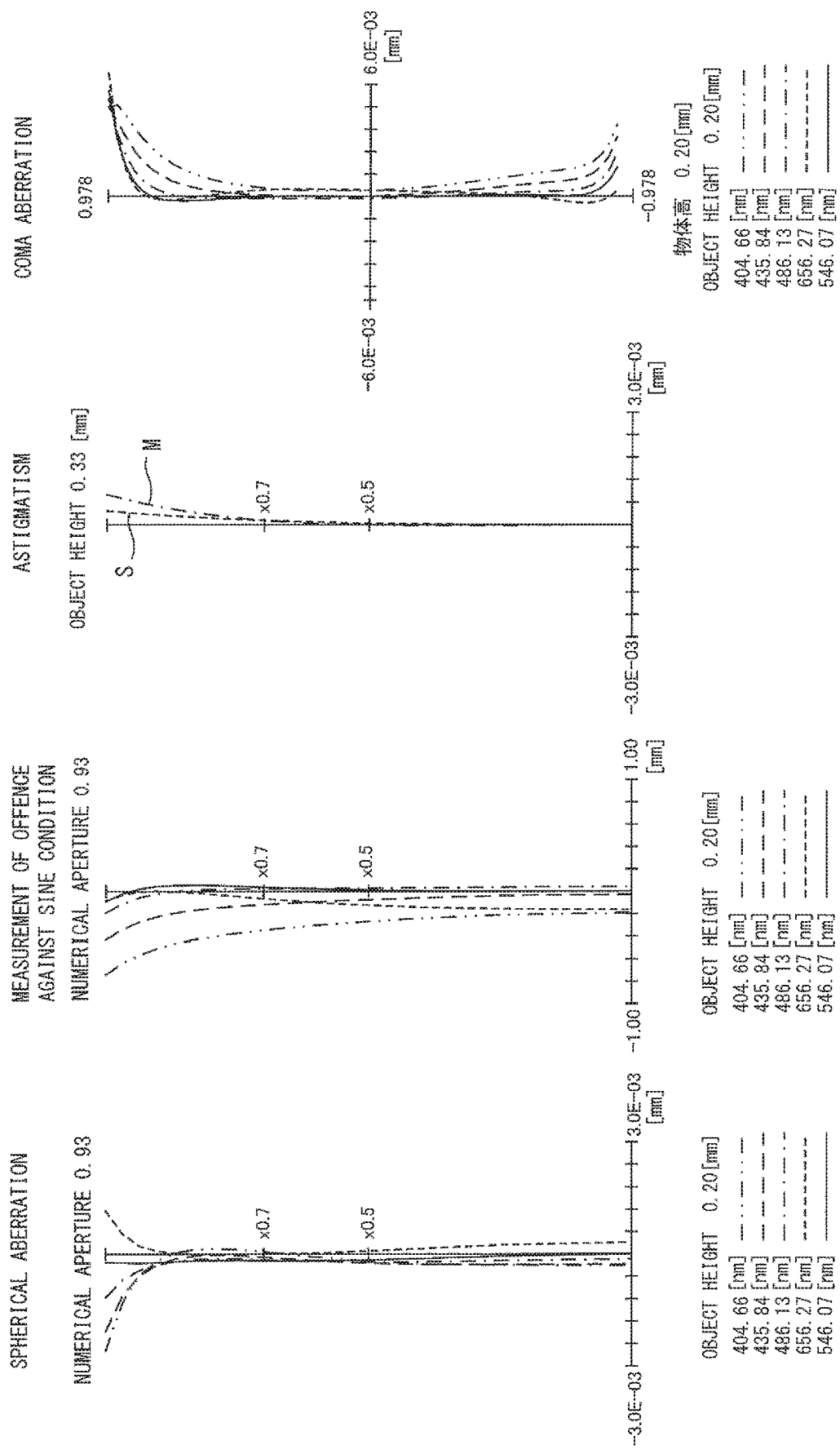
FIG. 8A to FIG. 8D are diagrams of aberrations of the objective 3 illustrated in FIG. 7.

FIG. 8A to FIG. 8D are diagrams illustrating aberration when the thickness t of cover glass of the objective 3 illustrated in FIG. 7 is 0.17 mm. FIG. 8A to FIG. 8D illustrate aberration on an object surface when an infinite distant light flux enters from the image side. FIG. 8A is a diagram illustrating a spherical aberration, FIG. 8B is a diagram illustrating a measurement of offence against sine condition, FIG. 8C is a diagram illustrating an astigmatism, and FIG. 8D is a diagram illustrating a coma aberration at a position at which an object height ratio is 0.6 (object height 0.2 mm). Note that in the diagrams, "M" denotes a meridional component and "S" denotes a sagittal component. As illustrated in FIG. 8A to FIG. 8D, in the present embodiment, aberrations are favorably corrected across a wide field of view.

Embodiment 4

Figure 9:
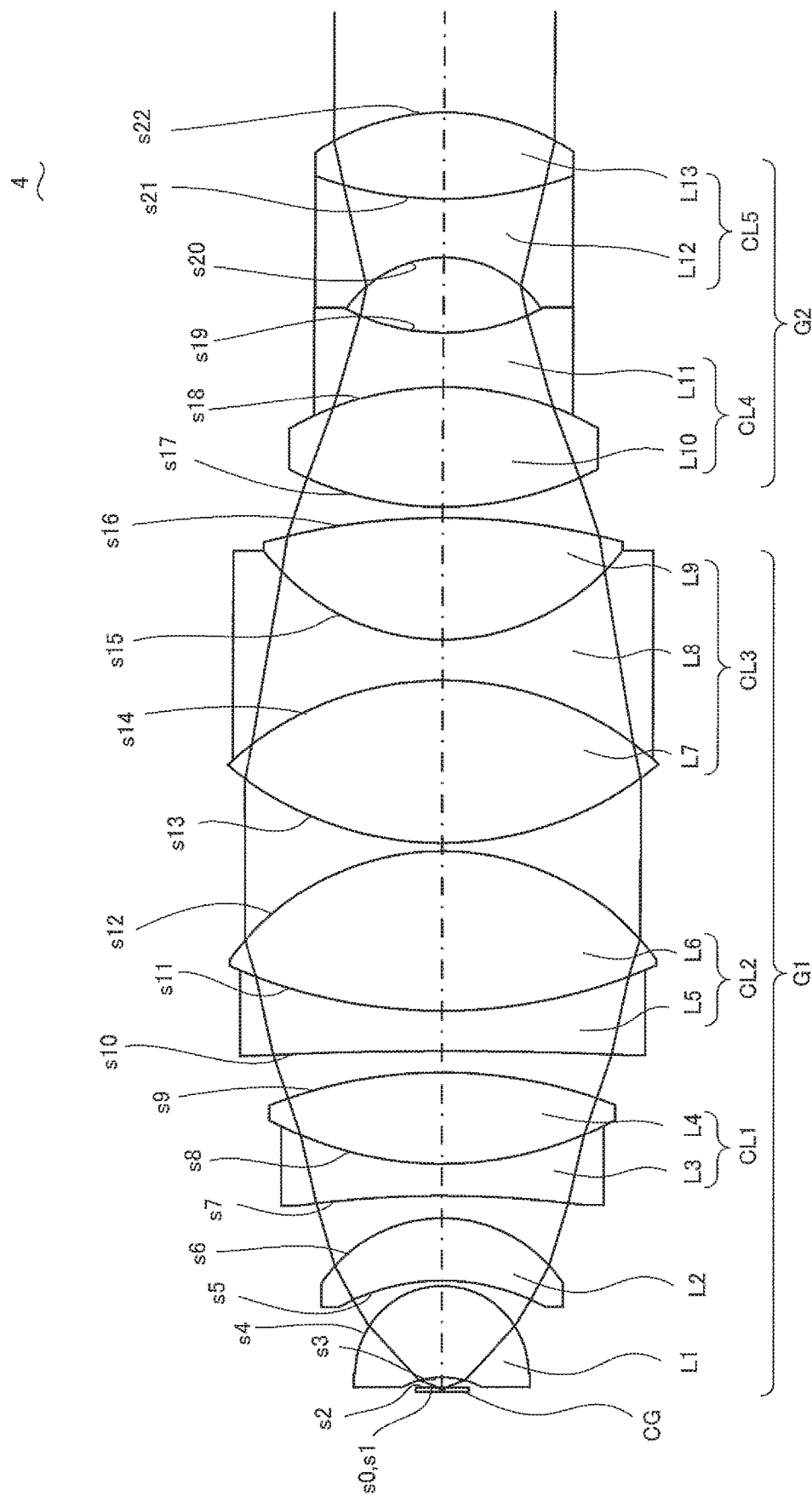
FIG. 9 is a cross-sectional view of the objective 4 according to Embodiment 4 of the present invention.

FIG. 9 is a cross-sectional view of an objective 4 according to the present embodiment. The objective 4 includes a first lens group G1 that has a positive refractive power, which converts a divergent pencil of light from an object point into a convergent pencil of light, and a second lens group G2 that has a negative refractive power and is arranged closer to an image than the first lens group G1 is. Note that the objective 4 is a dry objective for a microscope.

The first lens group G1 includes a lens L1 (first lens component) having a meniscus shape with the concave surface facing an object side, a lens L2 (second lens component) having a meniscus shape with the concave surface facing the object side, a cemented lens CL1, a cemented lens CL2, and a cemented lens CL3, and these lenses are arranged in this order from the object side.

The lens L2 has a positive refractive power. The cemented lens CL1 is a moving lens component that moves along the optical axis. The cemented lens CL1 is a cemented doublet lens consisting of a biconcave lens L3 (first negative lens) and a biconvex lens L4 and has a meniscus shape with the concave surface facing the object side. The cemented lens CL2 is a cemented doublet lens consisting of a biconcave lens L5 and a biconvex lens L6 and has a meniscus lens shape with the concave surface facing the object side. The cemented lens CL3 is a cemented triplet lens consisting of a biconvex lens L7, a biconcave lens L8, and a biconvex lens L9. In other words, it is a positive-negative-positive cemented triplet lens including a negative lens (the biconcave lens L8) and positive lenses (the biconvex lens L7 and the biconvex lens L9) arranged on either side of the negative lens.

The second lens group G2 includes a cemented lens CL4 and a cemented lens CL5, and these lenses are arranged in this order from the object side.

The cemented lens CL4 is a cemented doublet lens consisting of a biconvex lens L10 and a biconcave lens L11 (second negative lens) and is a meniscus lens component (first Gauss lens component) with the concave surface facing the image side. The cemented lens CL5 is a cemented doublet lens consisting of a biconcave lens L12 and a biconvex lens L13 and is a meniscus lens component (second Gauss lens component) with the concave surface facing the object side The cemented lens CL5 is arranged closer to an image than the cemented lens CL4 is.

Specific data of the objective 4 is provided below. Here, $f_{G1}$ and $f_{G2}$ are a focal length of the first lens group and a focal length of the second lens group, respectively. $|\beta|$ is a magnification when the objective 4 is used in combination with an image lens having a focal length of 180 mm.

$NA_{ob}$=0.93, $\Delta z_1$=0.04 μm, $DOF_e$=0.32 μm, $Y_{reso}$=0.32 mm, $|\beta|$=40, $vd_1$=42.41, $\theta gF_1$=0.561, $vd_2$=42.41, $\theta gF_2$=0.561, $n_{eo}$=1.48915, $vd_o$=70.23, $D_{GM1}$=(NA), $D_{GM2}$=(NA), $R_{cemo}$=−11.5 mm, $D_{Go}$=6.551 mm, $D_1$=3.421 mm, $R_{12}$=−3.2763 mm, $M_{UC}$=1.01, f=4.500 mm, $f_{UC}$=−236.500 mm, $f_{G1}$=7.7 mm, $f_{G2}$=−17.4 mm The lens data of the objective 4 is provided below. Note that INF in the lens data denotes infinity (∞).

Objective 4

| s | r | d | ne | nh | vd |
|---|---|---|---|---|---|
| 0 | INF | | | | |
| 1 | INF | t | 1.52626 | 1.54042 | 54.41 |
| 2 | INF | D2 | | | |
| 3 | −2.9988 | 3.421 | 1.77621 | 1.79917 | 49.6 |
| 4 | −3.2763 | 0.200 | | | |
| 5 | −8.1942 | 2.347 | 1.57098 | 1.58258 | 71.3 |
| 6 | −5.4671 | D6 | | | |
| 7 | −40.3151 | 1.200 | 1.64132 | 1.66385 | 42.41 |
| 8 | 13.572 | 3.454 | 1.43986 | 1.44647 | 94.66 |
| 9 | −17.8903 | D9 | | | |
| 10 | −140.6354 | 1.500 | 1.61664 | 1.63723 | 44.49 |
| 11 | 19.8789 | 6.023 | 1.43986 | 1.44647 | 94.66 |
| 12 | −9.9326 | 0.300 | | | |
| 13 | 12.6709 | 6.101 | 1.43986 | 1.44647 | 94.66 |
| 14 | −12.0308 | 1.550 | 1.48915 | 1.49898 | 70.23 |
| 15 | 8.5096 | 4.568 | 1.43986 | 1.44647 | 94.66 |
| 16 | −25.4706 | 0.406 | | | |
| 17 | 12.674 | 4.515 | 1.49846 | 1.5072 | 81.54 |
| 18 | −11.5061 | 2.037 | 1.64132 | 1.66385 | 42.41 |
| 19 | 8.1177 | 2.818 | | | |
| 20 | −4.5196 | 2.201 | 1.72407 | 1.75033 | 41.98 |
| 21 | 14.1964 | 3.264 | 1.7434 | 1.77943 | 32.33 |
| 22 | −8.7132 | | | | |

Note that the surfaces denoted by the surface numbers s0, s1, and s2 are an object surface, a surface of a cover glass CG on the object side, and a surface of the cover glass CG on an image side, respectively. The surfaces denoted by the surface numbers s3, and s22 are a lens surface of the objective 4 closest to the object and a lens surface of the objective 4 closest to the image, respectively.

A surface interval t between the surface number s1 and the surface number s2 is the thickness of the cover glass CG and is a variable amount that changes in accordance with the cover glass CG. A surface interval D2 between the surface number s2 and the surface number s3 is an air space between the cover glass CG and the objective 4 and is a variable amount that changes in accordance with the cover glass CG. A surface interval D6 between the surface number s6 and the surface number s7 and a surface interval D9 between the surface number s9 and the surface number s10 are air spaces between a moving lens component and a lens component adjacent to the moving lens component and is a variable amount that changes in accordance with a position of the moving lens component. The position of the moving lens component is adjusted in accordance with the thickness of the cover glass CG as an example.

The relationship between the above-mentioned variable amounts are provided below.

| | t (thickness of CG) | | |
|---|---|---|---|
| | 0.17 | 0.11 | 0.23 |
| D2 | 0.414 | 0.453 | 0.375 |
| D6 | 0.843 | 1.318 | 0.330 |
| D9 | 0.805 | 0.330 | 1.318 |

As described below, the objective 4 satisfies the conditional expressions (1) to (14) except the conditional expression (10).

$$NA_{ob}=0.93 \quad (1)$$

$$\Delta z_1/DOF_e=0.13 \quad (2)$$

$$Y_{reso}\times|\beta|=12.8 \text{ mm} \quad (3)$$

$$vd_1=42.41 \quad (4)$$

$$\theta gF_1=0.561 \quad (5)$$

$$vd_2=42.41 \quad (6)$$

$$8gF_2=0.561 \quad (7)$$

$$n_{eo}=1.48915 \quad (8)$$

$$vd_o=70.23 \quad (9)$$

$$D_{GM1}/D_{GM2}=(NA) \quad (10)$$

$$R_{cem}/D_{Go}=-1.76 \quad (11)$$

$$D_1/R_{12}=-1.04 \quad (12)$$

$$M_{UC}=1.01 \quad (13)$$

$$f/f_{UC}=-0.019 \quad (14)$$

FIG. 10A to FIG. 10D are diagrams illustrating aberration when the thickness t of cover glass of the objective 4 illustrated in FIG. 9 is 0.17 mm. FIG. 10A to FIG. 10D illustrate aberration on an object surface when an infinite distant light flux enters from the image side. FIG. 10A is a diagram illustrating a spherical aberration, FIG. 10B is a diagram illustrating a measurement of offence against sine condition, FIG. 10C is a diagram illustrating an astigmatism, and FIG. 10D is a diagram illustrating a coma aberration at a position at which an object height ratio is 0.6 (object height 0.2 mm). Note that in the diagrams, "M" denotes a meridional component and "S" denotes a sagittal component. As illustrated in FIG. 10A to FIG. 10D, in the present embodiment, aberrations are favorably corrected across a wide field of view.

The invention claimed is:

1. A dry objective comprising:
a first lens group having a positive refractive power that converts a divergent pencil of light from an object point into a convergent pencil of light; and
a second lens group having a negative refractive power and being arranged closer to an image than the first lens group being,
wherein the dry objective includes a moving lens component that moves along an optical axis, and satisfies conditional expressions of:

$$0.85 \leq NA_{ob} < 1.0 \quad (1); \text{ and}$$

$$9 \text{ mm} \leq Y_{reso} \times |\beta| \leq 20 \text{ mm} \quad (3),$$

where $NA_{ob}$ is a numerical aperture of the dry objective, $Y_{reso}$ is a maximum object height in a region in which a value obtained by dividing RMS wavefront aberration at e-line by a wavelength of the e-line is 0.2 or smaller, the region being on a plane that is orthogonal to the optical axis and intersects with an on-axis position at which the RMS wavefront aberration at the e-line is minimized, and $\beta$ is a magnification of the dry objective.

2. The dry objective according to claim 1, wherein the dry objective includes a first negative lens, and satisfies conditional expressions of:

$$30 \leq vd_1 \leq 43 \quad (4); \text{ and}$$

$$0.55 \leq \theta gF_1 \leq 0.57 \quad (5)$$

where $vd_1$ is an Abbe number of the first negative lens, and $\theta gF_1$ is a partial dispersion ratio of the first negative lens.

3. The dry objective according to claim 2, wherein the dry objective includes a second negative lens that is different from the first negative lens and satisfies conditional expressions of:

$$30 \leq vd_2 \leq 43 \quad (6); \text{ and}$$

$$0.55 \leq \theta gF_2 \leq 0.57 \quad (7)$$

where $vd_2$ is an Abbe number of the second negative lens and $\theta gF_2$ is a partial dispersion ratio of the second negative lens.

4. The dry objective according to claim 1, wherein the second lens group
includes a first Gauss lens component that is a meniscus lens component with a concave surface facing an image side and a second Gauss lens component that is arranged closer to the image than the first Gauss lens component is and is a meniscus lens component with a concave surface facing an object side, or
includes the first Gauss lens component, a third Gauss lens component that is arranged closer to the image than the first Gauss lens component is and is a lens component with a convex surface facing the image side, and a fourth Gauss lens component that is arranged between the first Gauss lens component and the third Gauss lens component and is a lens component with a concave surface facing the object side, and
the dry objective further includes a cemented triplet lens.

5. The dry objective according to claim 4, wherein the cemented triplet lens includes
a negative lens; and
two positive lenses arranged on either side of the negative lens.

6. The dry objective according to claim 5, wherein the dry objective satisfies a conditional expression of $$1.4 \leq n_{eo} \leq 1.55 \quad (8)$$

where $n_{eo}$ is a refractive index at the e-line of the negative lens included in the cemented triplet lens.

7. The dry objective according to claim 5, wherein the dry objective satisfies a conditional expression of $$60 \leq vd_0 \leq 80 \quad (9)$$

where $vd_o$ is an Abbe number of the negative lens included in the cemented triplet lens.

8. The dry objective according to claim 4, wherein the third Gauss lens component and the fourth Gauss lens component are arranged adjacent to each other with an air gap therebetween.

9. The dry objective according to claim 8, wherein the dry objective satisfies a conditional expression of $$0.005 \leq D_{GM1}/D_{GM2} \leq 0.5 \quad (10)$$

where $D_{GM1}$ is a distance on the optical axis between a lens surface on the object side of the third Gauss lens component and a lens surface on the image side of the fourth Gauss lens component, and $D_{GM2}$ is a distance on the optical axis between a lens surface on the image side of the third Gauss lens component and a lens surface on the object side of the fourth Gauss lens component.

10. The dry objective according to claim 4, wherein the first Gauss lens component is a cemented doublet lens, and
the dry objective satisfies a conditional expression of $$-3 \leq R_{cem}/D_{Go} \leq -0.5 \quad (11)$$

where $R_{cem}$ is a radius of curvature of a cemented surface of the cemented doublet lens and $D_{Go}$ is a thickness of the cemented doublet lens on the optical axis.

11. The dry objective according to claim 1, wherein the dry objective includes a first lens component that is arranged closest to the object and has a meniscus lens shape with a concave surface facing an object side and satisfies a conditional expression of $$-3 \leq D_1/R_{12} \leq -0.75 \quad (12)$$

where $D_1$ is a thickness of the first lens component on the optical axis, and $R_{12}$ is a radius of curvature of a lens surface closest to the image in the first lens component.

12. The dry objective according to claim 11, wherein the dry objective includes a second lens component that is arranged on an image side of the first lens component and has a positive refractive power and a meniscus shape with a concave face facing the object side.

13. The dry objective according to claim 1, wherein the dry objective satisfies a conditional expression of $$0.5 \leq M_{UC} \leq 2 \quad (13)$$

where $M_{UC}$ is a magnification of the moving lens component.

14. The dry objective according to claim 1, wherein the moving lens component has a meniscus lens shape with a concave surface facing an object side.

15. The dry objective according to claim 1, wherein
The moving lens component satisfies a conditional expression of $$-0.3 \leq f/f_{UC} \leq 0.3 \quad (14)$$

where f is a focal length of the dry objective and $f_{UC}$ is a focal length of the moving lens component.

16. A dry objective comprising:
a first lens group having a positive refractive power that converts a divergent pencil of light from an object point into a convergent pencil of light; and
a second lens group having a negative refractive power and being arranged closer to an image than the first lens group being,
wherein the dry objective includes a moving lens component that moves along an optical axis, and satisfies conditional expressions of:

$$0.85 \leq NA_{ob} < 1.0 \quad (1); \text{ and}$$

$$-2 \leq \Delta z_1/DOF_e \leq 2 \quad (2),$$

where $NA_{ob}$ is a numerical aperture of the dry objective, $\Delta z_1$ is a difference between an on-axis position at which RMS wavefront aberration at a h-line is minimized and an on-axis position at which RMS wavefront aberration at an e-line is minimized, and $DOF_e$ is a depth of focus at the e-line.

17. The dry objective according to claim 16, wherein the dry objective satisfies a conditional expression of $$9 \text{ mm} \leq Y_{reso} \times |\beta| \leq 20 \text{ mm} \quad (3),$$

where $Y_{reso}$ is a maximum object height in a region in which a value obtained by dividing RMS wavefront aberration at the e-line by a wavelength of the e-line is 0.2 or smaller, the region being on a plane that is orthogonal to the optical axis and intersects with the on-axis position at which the RMS wavefront aberration at the e-line is minimized, and β is a magnification of the dry objective.

18. The dry objective according to claim 16, wherein the dry objective includes a first negative lens, and satisfies conditional expressions of:

$$30 \leq vd_1 = 43 \quad (4); \text{ and}$$

$$0.55 \leq \theta gF_1 \leq 0.57 \quad (5)$$

where $vd_1$ is an Abbe number of the first negative lens, and $\theta gF_1$ is a partial dispersion ratio of the first negative lens.

19. The dry objective according to claim 18, wherein the dry objective includes a second negative lens that is different from the first negative lens and satisfies conditional expressions of:

$$30 \leq vd_2 \leq 43 \quad (6); \text{ and}$$

$$0.55 \leq \theta gF_2 \leq 0.57 \quad (7)$$

where $vd_2$ is an Abbe number of the second negative lens and $\theta gF_2$ is a partial dispersion ratio of the second negative lens.

20. The dry objective according to claim 16, wherein the second lens group
includes a first Gauss lens component that is a meniscus lens component with a concave surface facing an image side and a second Gauss lens component that is arranged closer to the image than the first Gauss lens component is and is a meniscus lens component with a concave surface facing an object side, or
includes the first Gauss lens component, a third Gauss lens component that is arranged closer to the image than the first Gauss lens component is and is a lens component with a convex surface facing the image side, and a fourth Gauss lens component that is arranged between the first Gauss lens component and the third Gauss lens component and is a lens component with a concave surface facing the object side, and
the dry objective further includes a cemented triplet lens.

* * * * *